US012561274B2

(12) United States Patent
Zhang et al.

(10) Patent No.: US 12,561,274 B2
(45) Date of Patent: Feb. 24, 2026

(54) DYNAMIC DISPLAY SERIAL INTERFACE PHYSICAL LAYER INTERFACE CONFIGURATION CHANGE

(71) Applicant: QUALCOMM Incorporated, San Diego, CA (US)

(72) Inventors: Nan Zhang, Beijing (CN); Zhibing Zhou, Shenzhen (CN); Yongjun Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 39 days.

(21) Appl. No.: 18/697,792

(22) PCT Filed: Dec. 15, 2021

(86) PCT No.: PCT/CN2021/138209
§ 371 (c)(1),
(2) Date: Apr. 2, 2024

(87) PCT Pub. No.: WO2023/108461
PCT Pub. Date: Jun. 22, 2023

(65) Prior Publication Data
US 2024/0403257 A1     Dec. 5, 2024

(51) Int. Cl.
*G06F 13/42*          (2006.01)
*G06F 13/40*          (2006.01)

(52) U.S. Cl.
CPC ...... *G06F 13/4291* (2013.01); *G06F 13/4022* (2013.01)

(58) Field of Classification Search
None
See application file for complete search history.

(56) References Cited

U.S. PATENT DOCUMENTS

2011/0010477 A1    1/2011  Lee et al.
2015/0134866 A1*   5/2015  Ranganathan ...... G06F 13/4027
                                          710/315
(Continued)

FOREIGN PATENT DOCUMENTS

JP         H1041366 A      2/1998
JP       2017195500 A     10/2017
(Continued)

OTHER PUBLICATIONS

International Search Report and Written Opinion—PCT/CN2021/138209—ISA/EPO—Jun. 14, 2022.

*Primary Examiner* — Henry Tsai
*Assistant Examiner* — Aurangzeb Hassan
(74) *Attorney, Agent, or Firm* — Loza & Loza, LLP

(57)          ABSTRACT

A method for changing operating frequency in a serial data link includes transmitting first datagrams over the serial data link using a first physical layer interface configured for a first frequency of operation, configuring a second physical layer interface for a second frequency of operation different from the first frequency of operation while the first datagrams are transmitted over the serial data link, transmitting configuration information over the serial data link using the first physical layer interface after the second physical layer interface has been configured for the second frequency of operation, idling the serial data link by terminating transmissions by the first physical layer interface, decoupling the first physical layer interface from the serial data link, coupling the second physical layer interface to the serial data link, and transmitting second datagrams over the serial data link using the second physical layer interface and the second frequency of operation.

20 Claims, 14 Drawing Sheets

(56) References Cited

U.S. PATENT DOCUMENTS

| | | | |
|---|---|---|---|
| 2017/0032757 A1* | 2/2017 | Itoigawa | G09G 5/008 |
| 2017/0041086 A1 | 2/2017 | Park et al. | |
| 2017/0117979 A1* | 4/2017 | Sengoku | H04J 3/0605 |
| 2017/0118039 A1* | 4/2017 | Wiley | H04L 12/40136 |
| 2018/0321705 A1* | 11/2018 | Koshisaka | H04L 7/06 |
| 2019/0012981 A1* | 1/2019 | Kumar L S | H04L 69/18 |
| 2020/0244257 A1* | 7/2020 | Ji | H03K 19/20 |
| 2020/0304281 A1* | 9/2020 | Takahashi | H04L 7/0079 |
| 2020/0396378 A1* | 12/2020 | Jeong | H04N 25/617 |
| 2023/0058759 A1* | 2/2023 | Hori | H04L 25/0276 |
| 2023/0205723 A1* | 6/2023 | Takahashi | H04L 69/28 |
| | | | 710/306 |
| 2024/0007286 A1* | 1/2024 | Miyamoto | H04L 9/088 |
| 2024/0323992 A1* | 9/2024 | Zhang | H04B 17/328 |

FOREIGN PATENT DOCUMENTS

| | | | |
|---|---|---|---|
| JP | 2017195591 A | 10/2017 | |
| JP | 2018050163 A | 3/2018 | |
| JP | 2021057666 A | 4/2021 | |
| WO | 2010041366 A1 | 4/2010 | |
| WO | 2021164002 A1 | 8/2021 | |

* cited by examiner

FIG. 3

Display (DSI, DSI-2)

Camera (MIPI CSI-2)

D-PHY

1100

1300

DYNAMIC DISPLAY SERIAL INTERFACE PHYSICAL LAYER INTERFACE CONFIGURATION CHANGE

CROSS-REFERENCE TO RELATED APPLICATION(S)

This application is the U.S. national stage of PCT patent application number PCT/CN2021/138209 filed on Dec. 15, 2021.

TECHNICAL FIELD

The present disclosure relates generally to serial communication over a serial bus in a wireless communication device and, more particularly, to changing data communication rates over a display serial interface bus.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate through a serial bus. The serial bus may be operated in accordance with a standardized or proprietary protocol. In one example, a serial bus operated in accordance with an Inter-Integrated Circuit (I2C bus or I²C). The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal.

A serial bus can be operated in accordance with a multi-master protocol and one or more devices may be a designated a bus master or controller for the serial bus in some transmissions and a slave or respondent device for other transmissions. In one example, Improved Inter-Integrated Circuit (I3C) protocols may be used to control operations on a serial bus. I3C protocols are defined by the Mobile Industry Processor Interface (MIPI) Alliance and derive certain implementation aspects from the I2C protocol. In another example, the Radio Frequency Front-End (RFFE) interface defined by the MIPI Alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links.

Multiple standards are defined for interconnecting certain types of components in mobile communication devices. For example, there are multiple types of interfaces defined for communication between an application processor and display or camera components in a mobile communication device. Some components employ an interface that conforms to one or more standards or protocols specified by the MIPI Alliance, including standards and protocols for a camera serial interface (CSI) and a display serial interface (DSI).

The MIPI Alliance CSI-2, DSI and DSI-2 standards define a wired interface that can be deployed within or between IC devices and/or SoC devices to couple a camera and application processor using CSI protocols, or an application processor and display using DSI protocols. The low-level physical-layer (PHY) interface in each of these applications can be MIPI Alliance defined C-PHY or D-PHY interfaces. High-speed modes and low-power modes of communication are defined for C-PHY and D-PHY interfaces. The C-PHY high-speed mode uses a low-voltage multiphase signal transmitted in different phases on a 3-wire link. The D-PHY high-speed mode uses a plurality of 2-wire lanes to carry low-voltage differential signals. The low-power mode of C-PHY and D-PHY interfaces provides lower rates than the high-speed mode and transmits signals at higher voltages. The high-speed signals are undetectable by receivers configured for low-power operation.

As device technology improves, demands for higher data rate over serial buses and multiple mode display panels has generated greater needs for switching clock frequencies on serial data links used to drive display panels. Switching clock frequencies requires substantial reconfiguration and recalibration that can disrupt and destabilize a display subsystem. There is a continuous need to improve serial interfaces to take advantage of technology improvements while maintaining stability of operation

SUMMARY

Certain aspects of the disclosure relate to systems, apparatus, methods and techniques that enable a wireless communication device to perform DSI PHY switching in a manner that can provide faster, stable and safe DSI clock changes over a large range of operating frequencies.

In various aspects of the disclosure, a display subsystem has a first PHY configured in accordance with MIPI Alliance DSI specifications, a second PHY configured in accordance with the MIPI Alliance DSI specifications, and a switch configured to selectively couple a serial data link to the first PHY or the second PHY as directed by a controller. The controller may be configured to cause first datagrams to be transmitted over the serial data link using the first PHY using a first frequency of operation, configure the second PHY for a second frequency of operation different from the first frequency of operation while the first datagrams are transmitted over the serial data link, cause the first PHY to transmit configuration information over the serial data link using the first frequency of operation after the second PHY has been configured for the second frequency of operation, idle the serial data link after the configuration information has been transmitted by causing the first PHY to terminate transmissions over the serial data link, cause the switch to decouple the first PHY from the serial data link, cause the switch to couple the second PHY to the serial data link, and cause second datagrams to be transmitted over the serial data link using the second PHY using the second frequency of operation.

In various aspects of the disclosure, a method for changing operating frequency in a serial data link includes transmitting first datagrams over the serial data link using a first PHY configured for a first frequency of operation, configuring a second PHY for a second frequency of operation different from the first frequency of operation while the first datagrams are transmitted over the serial data link, transmitting configuration information over the serial data link using the first PHY after the second PHY has been configured for the second frequency of operation, idling the serial data link after transmitting the configuration information by terminating transmissions by the first PHY, decoupling the first PHY from the serial data link, coupling the second PHY to the serial data link, and transmitting second datagrams over the serial data link using the second PHY using the second frequency of operation.

In some aspects, a display driver is coupled to the serial data link and configured to reconfigure its PHY from the first frequency of operation to the second frequency of operation in response to the configuration information and after the serial data link has been idled. A clock generation circuit may be configured and calibrated to provide one or more clock signals corresponding to the second frequency of operation. The switch may be coupled to a wire interface circuit that is coupled to the serial data link.

In some aspects, the wire interface circuit may be reconfigured after the serial data link has been idled, and may be calibrated for the second frequency of operation. The wire interface circuit may be calibrated using a bus calibration procedure defined by C-PHY or D-PHY protocols when transmitting the second datagrams.

In various aspects of the disclosure, a display driver has a PHY configured in accordance with MIPI Alliance DSI specifications, and a controller. The controller may be configured to cause data to be extracted from first datagrams received from the serial data link through the PHY when the PHY is configured for a first frequency of operation, receive configuration information from at least one of the first datagrams, the configuration information identifying a second frequency of operation, reconfigure the PHY for the second frequency of operation when the serial data link enters a next idle state, and cause data to be extracted from second datagrams received from the serial data link when the PHY is configured for the second frequency of operation.

In various aspects of the disclosure, a method for changing operating frequency in a serial data link includes receiving first datagrams from the serial data link through a PHY when the PHY is configured for a first frequency of operation, receiving configuration information from at least one of the first datagrams, the configuration information identifying a second frequency of operation, reconfiguring the PHY for the second frequency of operation when the serial data link enters a next idle state, and receiving second datagrams from the serial data link when the PHY is configured for the second frequency of operation.

In some aspects, the PHY is configured in accordance with MIPI Alliance DSI specifications. The PHY may be configured by configuring a clock generation circuit to provide one or more clock signals corresponding to the second frequency of operation, and calibrating the clock generation circuit. A wire interface circuit may be configured and calibrated for the second frequency of operation after the serial data link has been idled. The wire interface circuit may be calibrated using a bus calibration procedure defined by C-PHY or D-PHY protocols when receiving the second datagrams.

BRIEF DESCRIPTION OF THE DRAWINGS

FIG. 3 illustrates an example of a C-PHY interface.

DETAILED DESCRIPTION

Figure 1:
FIG. 1 illustrates an apparatus employing a data link between IC devices and that is selectively operated according to a standard or proprietary protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Data communication links employed by SoCs and other IC devices to connect processors with modems and other peripherals may be operated in accordance with industry or proprietary standards or protocols associated with certain functions or types of devices. In the example of display panels, display subsystems, and display drivers, communication standards and protocols defined by the MIPI Alliance are frequently used. The Display Serial Interface (DSI®), for example, provides C-PHY and D-PHY standards and protocols used to define, configure and control a high-speed serial interface between a host processor and a display module. Other standards and protocols may be provided for ancillary uses, including control and management buses implemented using I2C or I3C protocols.

In mobile communication handsets, user equipment and other devices, interfaces operated in accordance with DSI specifications or protocols are frequently used for communications between application processors and display drivers. The data rates required to support high resolution displays can vary based on display configuration, power budgets and application requirements. Changing data rates requires reconfiguration and recalibration of the physical interface circuits coupled to the serial buses to enable the use of different frequencies for bit transmission clocks. The frequencies for bit transmission clocks may also be changed during device operation to mitigate electromagnetic interference (EMI). In one example, high data rate DSI signaling can involve transmission of signals over wires at frequencies similar to the frequencies of RF signals. Dynamically changing DSI clock signal frequencies, including while the display subsystem is active, can result in instability and failure of the display system.

A ping-pong DSI PHY switching technique disclosed herein can permit reliable, fast switching of DSI clock signal frequencies while maintaining system stability. In one example, a display subsystem has first and second DSI PHYs and a switch configured to selectively couple a serial data link to the first DSI PHY or the second DSI PHY as directed by a controller. The controller is configured to transmit first datagrams over the serial data link using the first DSI PHY and first frequency of operation, configure the second DSI PHY for a second frequency of operation while the first datagrams are transmitted over the serial data link, transmit configuration information over the serial data link using the first frequency of operation after the second DSI PHY has been configured for the second frequency of operation, idle the serial data link and causing the switch to decouple the first DSI PHY from the serial data link and couple the second DSI PHY to the serial data link. Second datagrams can then be transmitted over the serial data link using the second DSI PHY and the second frequency of operation.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include an SoC, or a processing circuit 102 having multiple circuits or devices 104, 106 and/or 108, which may be implemented in one or more ASICs. In one example, the apparatus 100 may operate as a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 or an external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
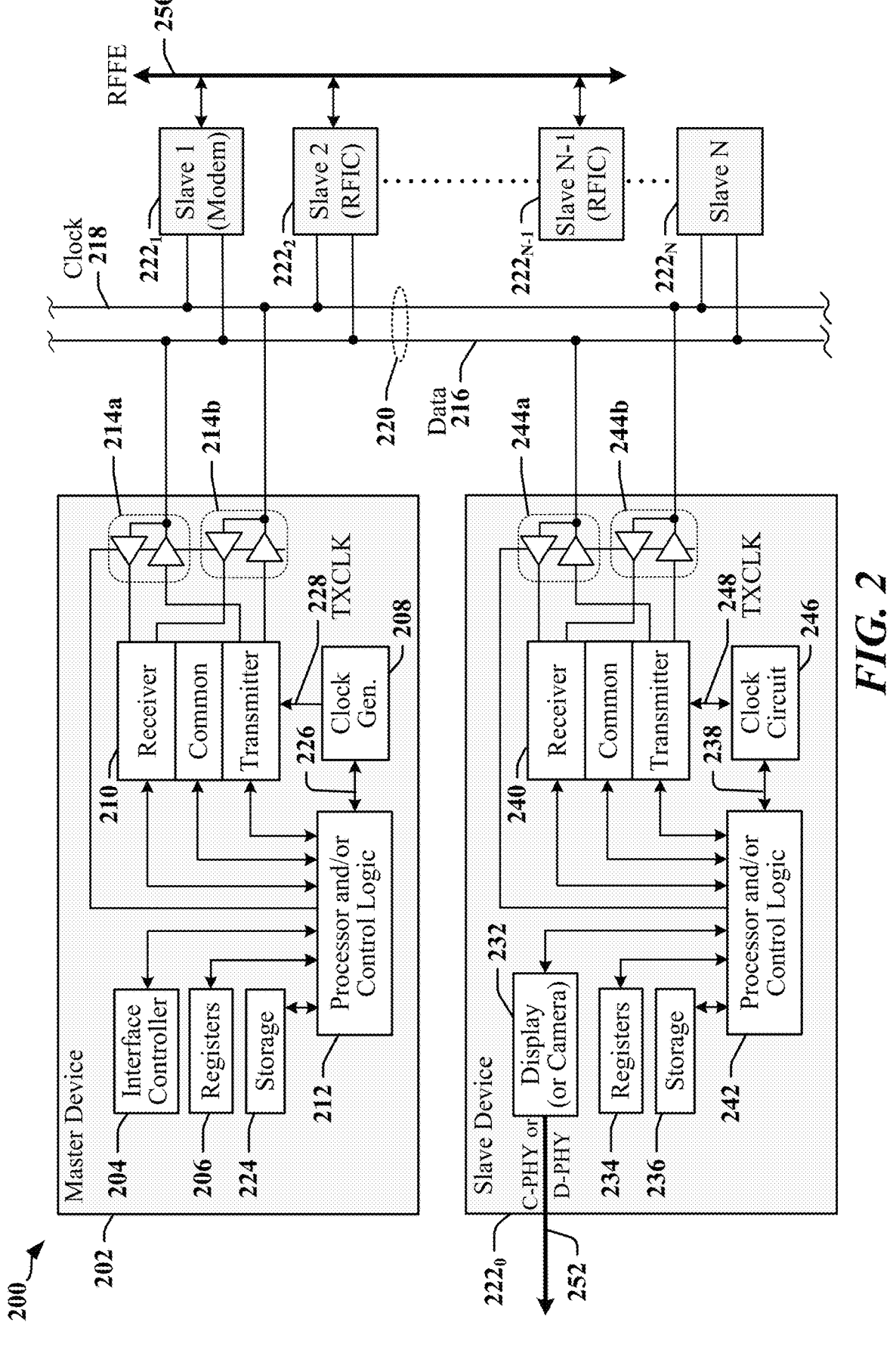
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master device 202. Certain types of bus can support multiple bus master devices 202.

In one example, a master device 202 may include an interface controller 204 that manages access to the serial bus, configures dynamic addresses for slave devices $222_0$-$222_N$ and/or generates a clock signal 228 to be transmitted on a clock line 218 of the serial bus 220. The master device 202 may include configuration registers 206 or other storage 224, and other control logic 212 configured to handle protocols and/or higher-level functions. The control logic 212 may include a processing circuit having a processing device such as a state machine, sequencer, signal processor or general-purpose processor. The master device 202 includes a transceiver 210 and line drivers/receivers 214*a* and 214*b*. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a display or imaging interface device may communicate with a display or camera through a DSI interface controller 232 that includes circuits and modules to support, control or communicate with the display or camera. The slave device $222_0$ may include configuration registers 234 or other storage 236, control logic 242, a transceiver 240 and line drivers/receivers 244*a* and 244*b*. The control logic 242 may include a processing circuit having a processing device such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data over a data line 216 based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with RFFE, I2C, I3C or other protocol. In some instances, two or more devices 202, $222_0$-$222_N$ may be configured to operate as a bus master device on the serial bus 220. In some instances, the apparatus 200 includes multiple serial buses 220, 250, 252 that couple two or more of the devices 202, $222_0$-$222_N$ or one of the devices 202, $222_0$-$222_N$ and a peripheral device such as a display, imaging device or a Radio-Frequency IC (RFIC). In the illustrated example, certain slave devices $222_1$, $222_2$, $222_{N-1}$ are coupled to a serial bus 250 that is operated in accordance with RFFE protocols, and two of these slave devices $222_1$, $222_2$ are also coupled to the primary serial bus 220 operated in accordance with another protocol. In the illustrated example, one slave device $222_0$ is configured to operate as a display controller that communicates with a display device over a serial bus 252 operated in accordance with a C-PHY protocol (or D-PHY protocol).

In certain aspects of this disclosure, systems and apparatus may employ multi-phase data encoding and decoding interface methods for communicating between IC devices. A multi-phase encoder may drive a plurality of conductors (i.e., M conductors). The M conductors typically include three or more conductors, and each conductor may be referred to as a wire, although the M conductors may include conductive traces on a circuit board or within a conductive layer of a semiconductor IC device. In one example, the MIPI Alliance-defined "C-PHY" physical layer interface technology may be used to connect camera or display to an application processor. The C-PHY interface employs three-phase symbol encoding to transmit data symbols on 3-wire lanes, or "trios" where each trio includes an embedded clock.

The M conductors may be divided into a plurality of transmission groups, each group encoding a portion of a block of data to be transmitted. An N-phase encoding scheme is defined in which bits of data are encoded in phase transitions and polarity changes on the M conductors. Decoding does not rely on independent conductors or pairs of conductors and timing information can be derived directly from phase and/or polarity transitions in the M conductors. N-Phase polarity data transfer can be applied to any physical signaling interface, including electrical, optical and radio frequency (RF) interfaces.

In the C-PHY example, a three-phase encoding scheme for a three-wire system may define three phase states and two polarities, providing 6 states and 5 possible transitions from each state. Deterministic voltage and/or current changes may be detected and decoded to extract data from the three wires.

Figure 3:
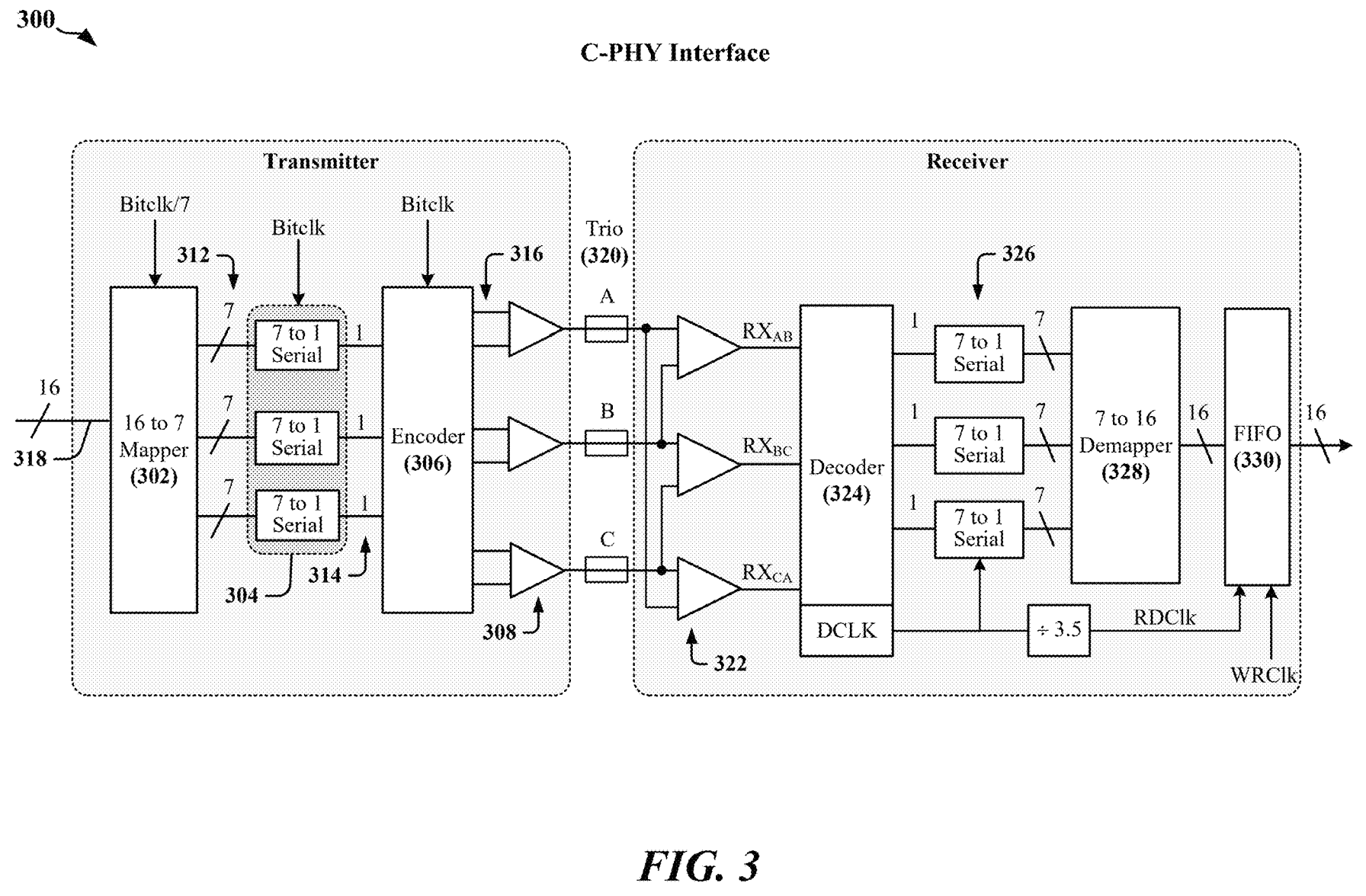

FIG. 3 illustrates a C-PHY interface 300 that may be used to implement certain aspects of the serial bus 252 depicted in FIG. 2. The illustrated example may relate to a three-wire link configured to carry three-phase polarity encoded data in accordance with DSI protocols. The use of 3-phase polarity encoding provides for high-speed data transfer and may consume half or less of the power of other interfaces because fewer than 3 drivers are active at any time in a C-PHY link. The C-PHY interface uses 3-phase polarity encoding to encode multiple bits per symbol transition on the three-wire link. In one example, a combination of three-phase encoding and polarity encoding may be used to support a wide video graphics array (WVGA), 80 frames per second liquid crystal display driver IC without a frame buffer, delivering pixel data for display refresh at 810 Mbps over three or more wires.

In the depicted C-PHY interface 300, three-phase polarity encoding is used to control signaling state of connectors, wires, traces and other interconnects that provide a 3-wire bus (the trio 320). Each wire in the trio 320 may be undriven, driven positive, or driven negative in any symbol transmission interval. In some instances, an undriven signal wire of the trio 320 may be in a high-impedance state. In some instances, an undriven signal wire of the trio 320 may be driven or pulled to a voltage level that lies substantially halfway between the positive and negative voltage levels provided on driven signal wires. In some instances, an undriven signal wire of the trio 320 may have no current flowing through it. Drivers 308 coupled to the signal wires of the trio 320 are controlled such that only one wire of the trio 320 is in each of three states (denoted as +1, −1, or 0) in each symbol interval.

In one example, drivers 308 may include unit-level current-mode drivers. In another example, drivers 308 may drive opposite polarity voltages on two signals transmitted on two signal wires of the trio 320 while the third signal wire is at high impedance and/or pulled to ground. For each transmitted symbol interval, at least one signal is in the undriven (0) state, while one signal is driven to the positive (+1 state) and one signal is driven to the negative (−1 state), such that the sum of current flowing to the receiver is always zero. For each symbol, the state of at least one signal wire of the trio 320 is changed from the symbol transmitted in the preceding transmission interval.

In the C-PHY interface 300, a mapper 302 may receive a 16-bit input data word 318, and the mapper 302 may map the input data word 318 to 7 symbols 312 for transmitting sequentially over the signal wires of the trio 320. An M-wire, N-phase encoder 306 configured for three-wire, three-phase encoding receives the 7 symbols 312 produced by the mapper one input symbol 314 at a time and computes the state of each signal wire of the trio 320 for each symbol interval, based on the immediately preceding state of the signal wires of the trio 320. The 7 symbols 312 may be serialized using parallel-to-serial converters 304, for example. The encoder 306 provides control signals 316 to define the outputs of the drivers 308. The encoder 306 selects the states of the signal wires of the trio 320 based on the input symbol 314 and the previous states of signal wires of the trio 320 and may provide control signals 316 to cause the drivers 308 to produce the desired signaling state on the trio 320.

The use of three-wire, three-phase encoding permits several bits to be encoded in a plurality of symbols where the bits per symbol is not an integer. In the example of a three-wire, three-phase system, there are 3 available combinations of 2 wires, which may be driven simultaneously, and 2 possible combinations of polarity on the simultaneously driven pair of wires, yielding 6 possible states. Since each transition occurs from a current state, 5 of the 6 states are available at every transition. With 5 states, $\log 2 (5)=2.32$ bits may be encoded per symbol transition. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

The C-PHY interface 300 includes a receiver that includes comparators 322 and a decoder 324 that are configured to provide a digital representation of the state of each of three signal wires of the trio 320, as well as the change in the state of the three signal wires compared to the state transmitted in the previous symbol period. Seven consecutive states are assembled by serial-to-parallel convertors 326 and used to produce a set of 7 symbols to be processed by a demapper 328 to obtain 16 bits of data that may be buffered in a first-in-first-out (FIFO) storage device 330, which may be implemented using registers, for example.

According to certain aspects disclosed herein, systems and apparatus may employ some combination of differential and single-ended encoding for communicating between IC devices. In one example, the MIPI Alliance-defined "D-PHY" physical layer interface technology may be used to connect camera and display devices to an application processor. The D-PHY interface can switch between a differential (High-Speed) mode and a single-ended low power (LP) mode in real time as needed to facilitate the transfer of large amounts of data or to conserve power and prolong battery life. The D-PHY interface is capable of operating in simplex or duplex configuration with single data lane or multiple data lanes with a unidirectional (Master to Slave) clock lane.

Figure 4:
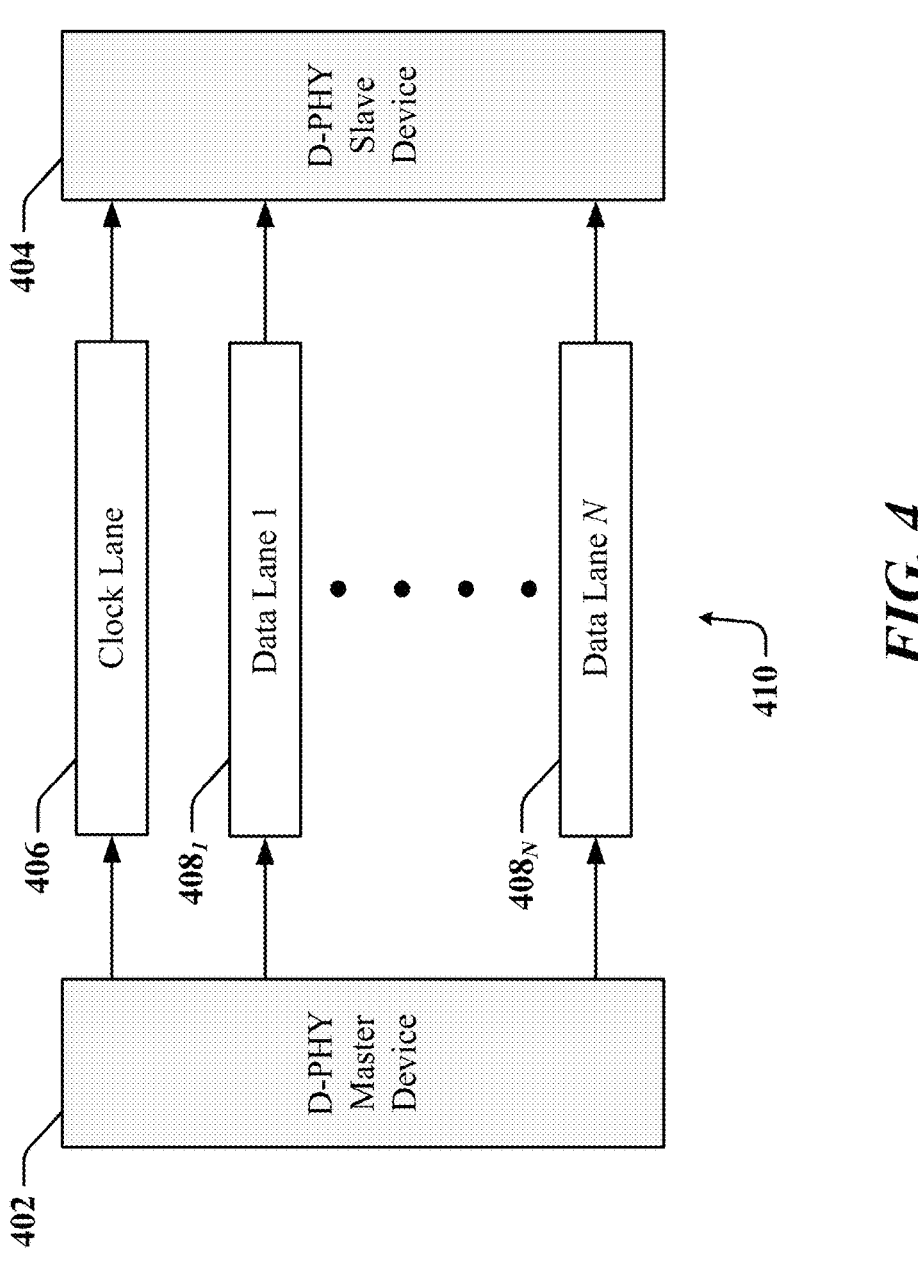
FIG. 4 illustrates an example of a D-PHY interface.
Figure 4:

FIG. 4 illustrates a generalized D-PHY configuration 400 that includes a master device 402 and a slave device 404. The master device 402 generates clock signals that control transmissions on the wires 410. A clock signal is transmitted on a clock lane 406 and data is transmitted in one or more data lanes $408_1$-$408_N$. The number of data lanes $408_1$-$408_N$ that are provided or active in a device may be dynamically configured based on application needs, volumes of data to be transferred and power conservation needs.

Figure 5:
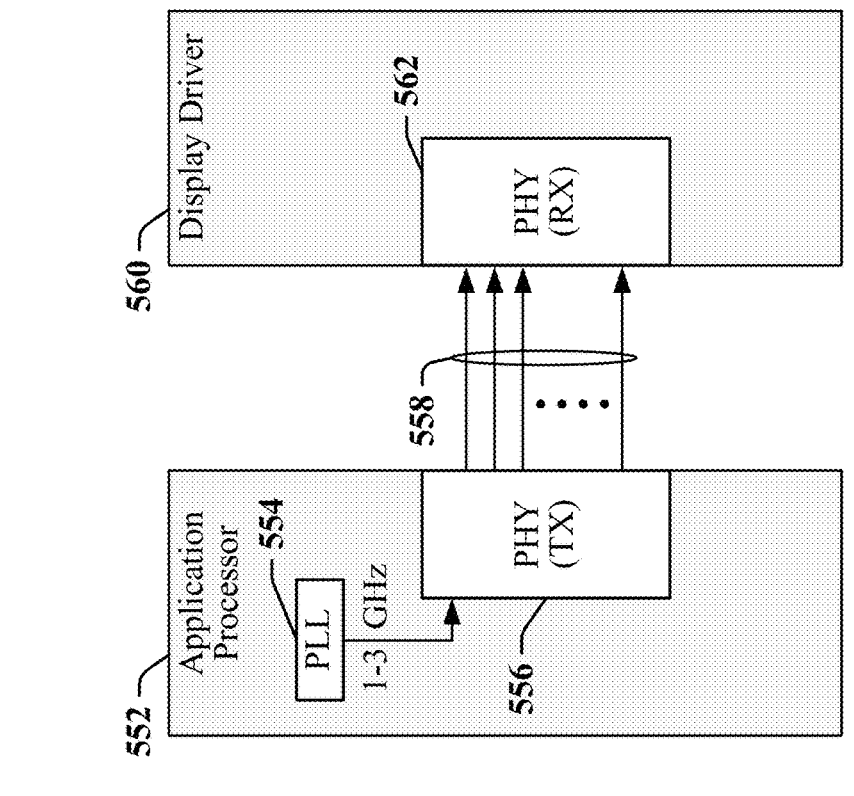
FIG. 5 illustrates examples of apparatus that may be adapted according to certain aspects disclosed herein.
Figure 5:
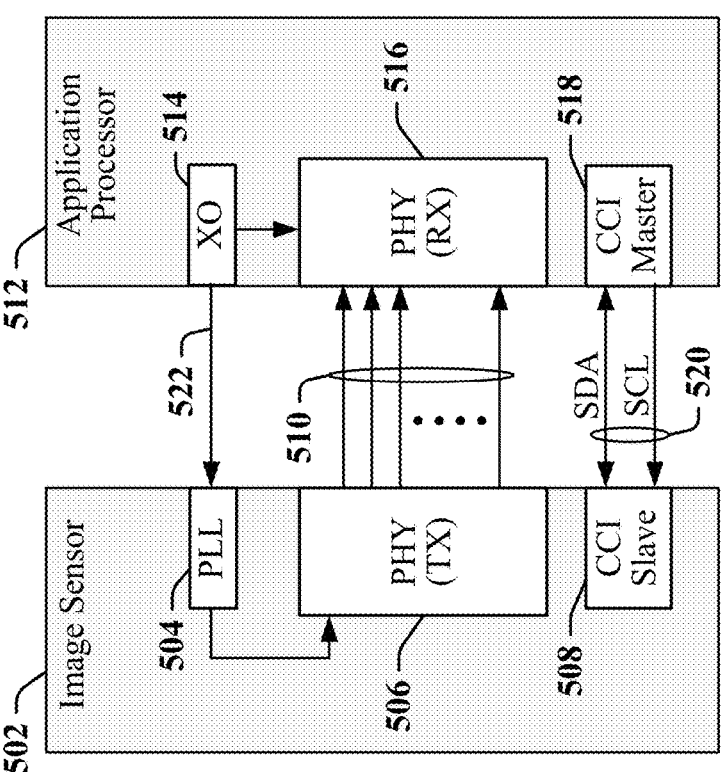

FIG. 5 illustrates certain interface configurations associated with a camera subsystem 500 and a display subsystem 550 that may be deployed within a mobile communication device, for example. The camera subsystem 500 may include a CSI-2 defined communication link between an image sensor 502 and an application processor 512. The communication link may include a high-data rate data transfer link 510 used by the image sensor 502 to transmit image data to the application processor 512 using a transmitter 506. The high-data rate data transfer link 510 may be configured and operated according to D-PHY or C-PHY protocols. The application processor 512 may include a crystal oscillator (XO 514) or other clock source to generate a clock signal 522 that controls the operation of the transmitter 506. The clock signal 522 may be processed by a phase-locked loop (PLL) 504 in the image sensor 502. In some instances, the clock signal 522 may also be used by the D-PHY or C-PHY receiver 516 in the application processor 512. The communication link may include a Camera Control Interface (CCI), which is similar in nature to the Inter-Integrated Circuit (I2C) interface. The CCI bus may include Serial Clock (SCL) line that carries a clock signal and a Serial Data (SDA) line that carries data. The CCI link 520 may be bidirectional and may operate at a lower data rate than the high-data rate data transfer link 510. The CCI link 520 may be used by the application processor 512 to transmit control and data information to the image sensor 502 and to receive control and configuration information from the image sensor 502. The application processor 512 may include a CCI bus master 518 and the image sensor 502 may include a CCI slave 508.

The display subsystem 550 may include a unidirectional data link 558 that can be configured and operated according to D-PHY or C-PHY protocols. In the application processor 552, a clock source such as the PLL 554 may be used to generate a bit clock signal used by a D-PHY or C-PHY receiver 556 to control transmissions on the data link 558. At the display driver 560, a D-PHY or C-PHY receiver 562 may extract embedded clock information from sequences of symbols transmitted on the data link, or from a clock lane provided in the data link 558.

Certain aspects disclosed herein relate to systems, apparatus and methods that support a broad range of interface protocols, and that can operate using different physical media. As shown in FIG. 5, for example, the camera subsystem 500 and/or display subsystem 550 may communicate high data rate information using D-PHY or C-PHY protocols. In some configurations, the camera subsystem 500 and/or display subsystem 550 may communicate using a reverse channel (e.g., the CCI link 520) for configuration of an image sensor 502 or other device. In some instances, a low power mode of operation may be defined for links that use either D-PHY or C-PHY protocols.

Figure 6:
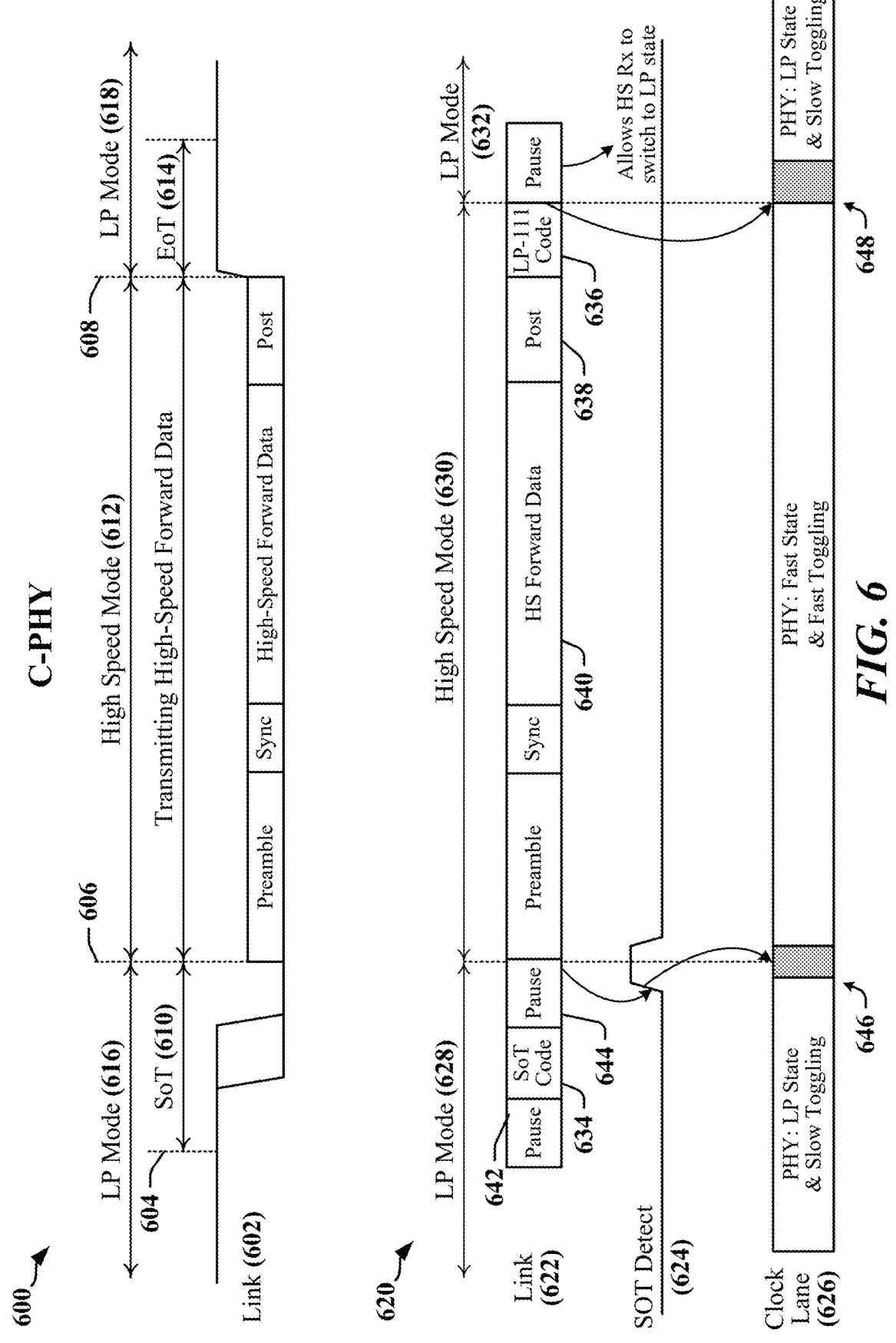
FIG. 6 illustrates transitions between signaling modes in an example of a C-PHY interface.

FIG. 6 illustrates transitions between communication modes of a C-PHY interface for a conventional mode of operation 600 and transitions between communication modes in an advanced low-power (ALP) mode of operation 620 in a C-PHY interface. In the conventional mode of operation 600 the C-PHY interface is initially configured for a low-power mode of operation 616. Commencing at a first point in time 604, the SoT sequence 610 is transmitted on the link 602 to switch the C-PHY interface to a high-speed mode of operation 612. High-speed transmission begins at a second point in time 606. Commencing at a third point in time 608, an EoT sequence 614 is transmitted to return the C-PHY interface to a low-power mode of operation 618. A receiver may determine that the return the C-PHY interface to a low-power mode of operation 618 is desired based on signaling received at the higher voltage levels of the low-power mode.

According to certain aspects disclosed herein, a C-PHY interface adapted to support an ALP mode of operation 620, transitions between high-speed and low-power modes in response to code words 634, 636 and a Post sequence 638 defined by C-PHY protocols. In the ALP mode of operation 620, low-voltage differential signaling is used for high-speed mode 630 and for low-power mode 628, 632. Accordingly, transitions between high-speed mode 630 and for low-power mode 628, 632 are not detectable using the voltage level sensors employed in some conventional C-PHY interfaces. Code words 634 and 636 and the Post sequence 638 used in ALP mode of operation 620 may be transmitted to convey corresponding mode transitions and/or other events. In the C-PHY example, a Post sequence 638 is already provided at the end of a high-speed data transmission to provide a reliable notification of the end of a high-speed burst to the receiver. In C-PHY protocols, the Post sequence 638 is provided at the end of high-speed (HS) Forward Data 640 and the PHY knows that the high-speed transmission is ended by detecting the Post sequence 638. The Post sequence 638 includes a series of unmapped code words (e.g., a sequence in which all symbols have a value of "4"). A start of transmission (SoT) code word 634 may be transmitted to initiate the high-speed mode 630. In some instances, the receiver may generate an SOT detect signal 624. The SoT code word 634 may include a sequence of code words. In one example, the SoT code word 634 may be defined as the sequence {LP-111, LP-001, LP-000}. The SoT code word 634 may be preceded by a first pause 642 and followed by a second pause 644.

In a C-PHY interface, symbol timing is embedded in the waveform, and there is no need to manage the transmission clock signal during transitions between high-speed mode 630 and low-power modes 628, 632. According to certain aspects disclosed herein, all of the LP Escape Mode Code Words in a C-PHY interface (see Table 1 below) can use in whole or in part, unique C-PHY sequences of seven or more symbols that are not created by the C-PHY data mapping function. This allows the C-PHY receiver to reliably detect all of the code words without having to rely as much on the specific state of transmission. While in the high-speed transmission mode, the C-PHY receiver can always recover to the correct power state.

An untransmitted clock lane 626, which may be representative of internal clock generation circuits or clock extraction circuits, begins transitioning from low-power mode 628 to high-speed mode 630 at a point in time 646 during the pause 644 that occurs after the SoT code word 634 has been transmitted on the on the link 622. The transition from low-power mode 628 to high-speed mode 630 may include pausing state low-power state toggling and enabling high-speed mode terminations. Transition from high-speed mode 630 to a next low-power mode 632 may be commenced at a point in time 648 after the LP-111 code has been transmitted on the on the link 622. The transition from high-speed mode 630 to a next low-power mode 632 may include pausing high-speed state toggling and enabling high-speed mode terminations.

In some instances, clock signals may be toggled only when a code needs to be transmitted when the PHY is in a low-power state. In some instances, a continuous clock mode may be implemented where one lane toggles on a regular basis during low-power state. The continuous clock mode can support certain implementations where some link activity is required or desired, including links that include optical media and/or links that operate in accordance with MIPI Alliance DSI-2 specifications. According to certain aspects, a master device may be configured to select a clock rate used in low-power and/or other modes.

Figure 7:
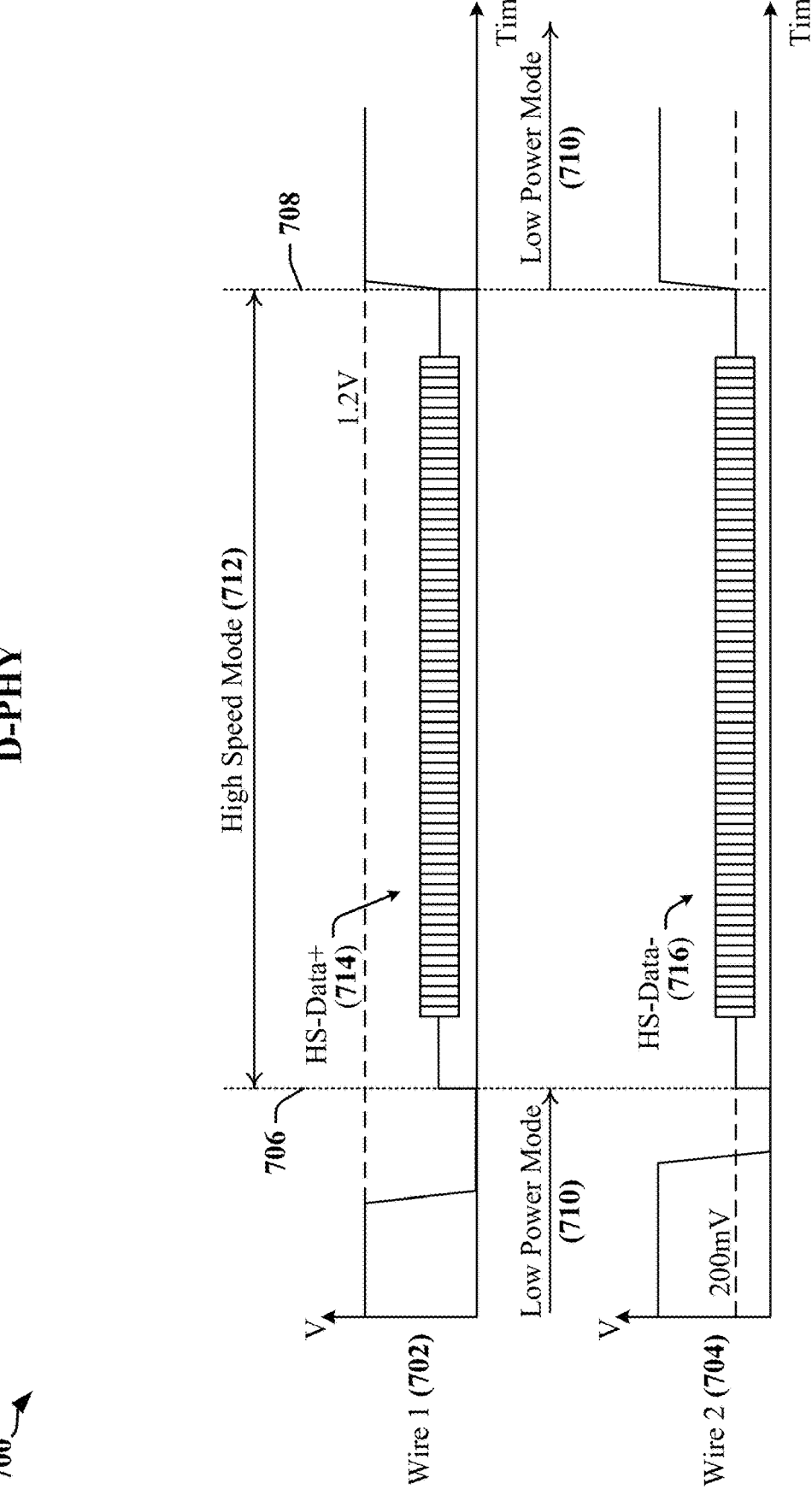
FIG. 7 illustrates transitions between signaling modes in a D-PHY interface adapted in accordance with certain aspects disclosed herein.

FIG. 7 is a graphical representation 700 of waveforms illustrating transitions between communication modes using an example of a D-PHY interface. The example depicts signaling over two wires 702, 704 that operate as data lanes in a communication link operated in accordance with D-PHY protocols. The D-PHY interface may be configured to operate in a low-power mode 710 and/or in a high-speed mode 712. In the illustrated example, the high-speed mode 712 starts at a first point in time 706 and ends at a second point in time 708.

In the low-power mode 710, a first wire carries data signals at a relatively low data rate and with a voltage level swing of approximately 1.2 volts. In the high-speed mode 712, the first wire 702 and second wire 704 carry a low-voltage differential signal that can have a data rate that is orders of magnitude faster than the data rate of the low-power mode 710. For example, the low-power mode 710 may support data rates up to 10 megabits per second (Mbps) while the high-speed mode 712 may support data rates that lie between 80 Mbps and 4.5 gigabits per second (Gbps). The positive version 714 of the differential signal may be carried on the first wire 702, while the negative version 716 of the differential signal is carried on the second wire 704, in the high-speed mode 712. The differential signal may have a relatively low amplitude voltage swing, which in one example may be approximately 200 millivolts (mV). Receivers in conventional C-PHY and D-PHY interfaces can use voltage level detectors to switch between high-speed and low-power modes of operation.

The bit clock signal in a DSI interface controls the data rate of the DSI interface and may be switched between the frequencies used to support different display resolutions or to mitigate electromagnetic interference (EMI) generated by the DSI interface. Mobile communication handsets and other user equipment and devices that include interfaces operated in accordance with DSI specifications are frequently among the top sources of RF interference with regards to the RF interface in the user equipment and devices. The data rates required to support high resolution displays or imaging devices can result in high-frequency EMI that can affect RF signals.

Certain standards that define DSI interfaces include a mandatory requirement that dynamic changes of clock frequency be supported. In one aspect of this disclosure, dynamic changes include changes that can be initiated while a device is active and without significantly affecting operations that are in progress. In certain examples, C-PHY or D-PHY interfaces may be clocked using clock signals that have a frequency of between 100 MHz and 1.8 GHz and interference with the RF signals associated with the RF modem in the mobile communication device can seriously affect wireless signal quality, reliability and mobility. Displays with higher resolution, greater bit depths and flexible and increased frames per second (FPS) rates may necessitate that C-PHY or D-PHY interfaces be clocked at frequencies that can be dynamically changed to accommodate dynamically switched FPS and display resolutions. In certain examples, C-PHY or D-PHY interfaces may be clocked using clock signal that have a frequency of between 100 MHz and 1.8 GHz.

The level of dynamic changes of clock frequency may be determined by the type of change or reason for the change.

For example, a 20 MHz change in DSI bit clock frequency from 800 MHz to 820 MHz may be sufficient for the purposes of reducing interference. Larger dynamic changes of clock frequency may be indicated for reducing power consumption and lowering DSI operating voltage. Changes in display resolution or FPS can necessitate large dynamic changes of DSI bit clock frequency. For example, a 150 MHz DSI bit clock frequency may be used for communicating with a display operating at 30 FPS while a 600 MHz DSI bit clock frequency may be used for communicating with a display operating at 120 FPS.

Dynamic DSI clock change techniques used in conventional systems are generally unable to handle large changes in DSI bit clock frequency reliably or safely. Changes in DSI bit clock frequency may be considered unsafe during run time when the changes result in instability and/or failures to comply with MIPI Alliance-defined specifications for DSI. Rapid switching of the DSI bit clock frequency, such as changes from 150 MHz to 600 MHz for example, can lead to DSI PHY instability and can easily cause loss of lock in the PLL 554 used to generate a bit clock signal for controlling transmissions on the data link 558 in FIG. 5. Rapid switching of the DSI bit clock frequency may require that the DSI PHY be reconfigured in its entirety to match the change in the DSI bit clock frequency and to ensure coherence of the DSI analog signals. For example, large changes in the DSI bit clock frequency necessitate that parameters defined by DSI timing regulations and specifications be changed to match a new target DSI bit clock frequency.

At the display panel, a significant DSI protocol level reconfiguration is generally performed in the display driver IC (DDIC) after large-magnitude changes to the DSI bit clock frequency. For example, the protocol may be changed to account for NULL packets that may be inserted in the data stream and to configure low power states such as the ultra-low power state (ULPS) during idle periods. Conventionally, changes to the DSI bit clock frequency involve concurrent changes to the configuration of the DSI PHY and to the configuration of the logic that implements DSI protocol, with the changes being made during frame refreshes, within the same vertical sync (Vsync) and/or during DSI idle periods. DSI signaling can enter an illegal intermediate state if the reconfiguration of DSI PHY and DSI protocol logic are not performed concurrently. For example, incorrect DSI signaling can occur when the DSI bit clock is changed at frame N, the DSI PHY timings are changed at frame N+1 and the DSI protocol configuration is changed at frame N+2. In the latter example, the DSI PHY may rendered or considered unstable.

Certain aspects of this disclosure provide methods, apparatus and techniques that can be used to rapidly switch frequency of a bit clock signal in a DSI interface. In one aspect, an active first DSI PHY in a transmitting device may be managing active communication with a DDIC using an initial DSI bit clock frequency while a second DSI PHY is configured to operate using a changed DSI bit clock frequency. The second DSI PHY may switch roles with the first DSI PHY when the second DSI PHY has achieved operational readiness at the changed DSI bit clock frequency of operation. The second DSI PHY then manages active communication with a DDIC while the first DSI PHY enters an idle state or begins a reconfiguration. In one example, operational readiness may be indicated when the clock generator circuit in the second DSI PHY is locked, stable and calibrated, when the protocol configuration has been completed in the second DSI PHY and when a timing configuration has been configured in the second DSI PHY.

At a later point in time, a switch may occur from the second DSI PHY to the first DSI PHY when the first DSI PHY is inactive and in a state of operation readiness. The switching between an active and inactive DSI PHYs may be referred to herein as dual ping-pong DSI PHY switching.

Dual Ping-Pong DSI PHY switching may involve switching between PHYs, and switching between certain related hardware circuits and/or protocol controllers. A hardware switch may be used to connect or disconnect the DSI PHYs involved in the ping-pong switching. Dual Ping-Pong DSI PHY switching can provide fast, stable and flexible large range DSI clock and PHY reconfiguration without disrupting operations involving a DDIC. In one example, the DSI bit clock frequency may be seamlessly switched from 50 MHz to 1.5 GHz along with concurrent changes to corresponding protocol and timing configurations as defined by DSI specifications.

Figure 8:
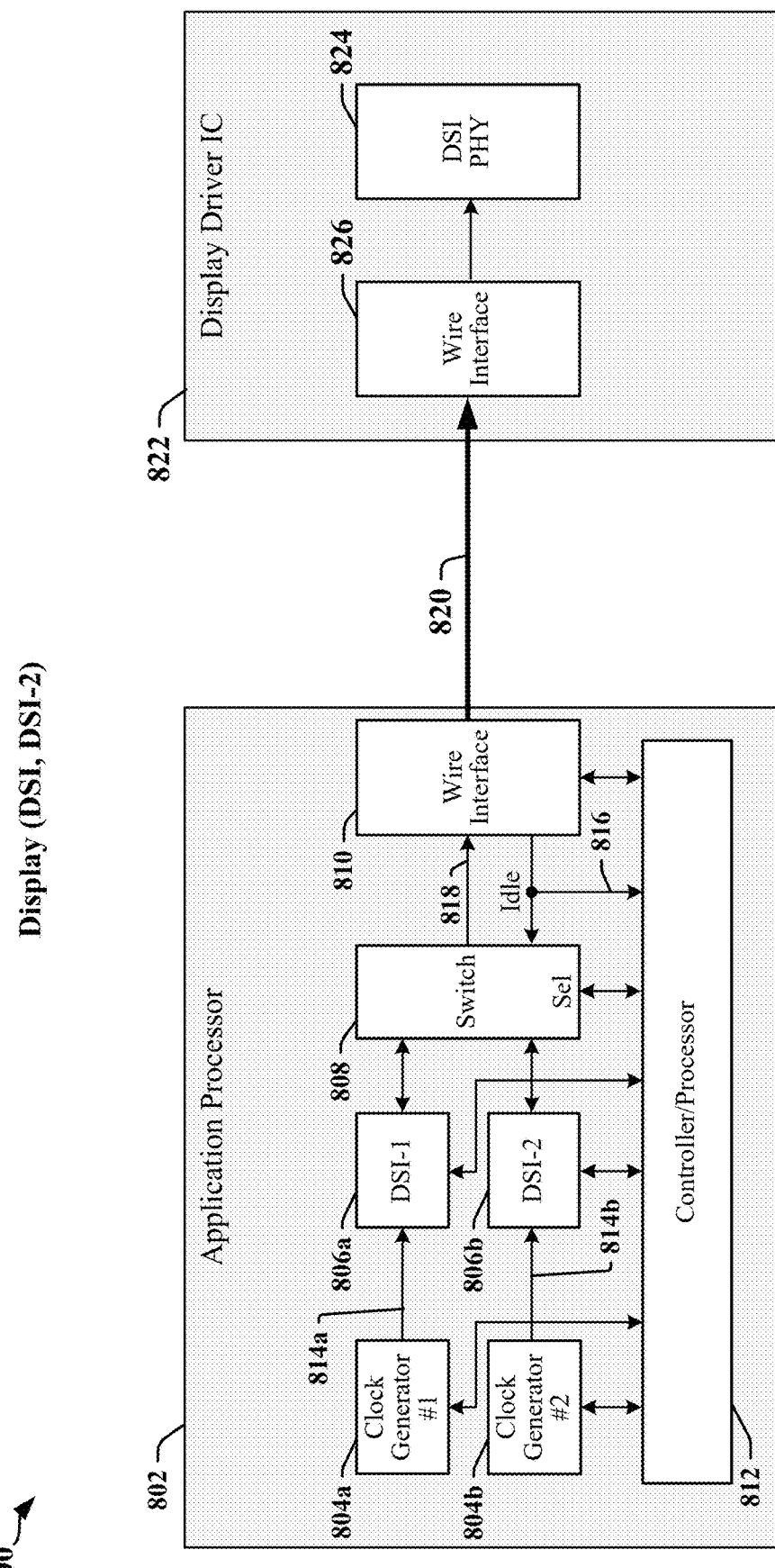
FIG. 8 illustrates a display subsystem that is configured for dual ping-pong MIPI Alliance DSI PHY switching in accordance with certain aspects of this disclosure.

FIG. 8 illustrates a display subsystem 800 that is configured for dual ping-pong DSI PHY switching in accordance with certain aspects of this disclosure. The display subsystem 800 may be deployed within a mobile communication device in some examples. In the illustrated example, the display subsystem 800 includes a multiwire serial data link 820 that can be configured and operated according to DSI specifications and protocols. In one example, data is communicated over the serial data link 820 using C-PHY protocols. In another example, data is communicated over the serial data link 820 using D-PHY protocols. A host device (here, the application processor 802) is coupled to a DDIC 822 through the serial data link 820. The application processor 802 may configure and control the DDIC 822 and may be configured to provide image data to the DDIC 822. The DDIC 822 includes a DSI PHY circuit 824 coupled to the serial data link 820 and configured to respond to transmissions encoded in accordance with a C-PHY or D-PHY protocol.

The illustrated application processor 802 includes two independently configurable clock generation circuits 804a, 804b and two independently configurable DSI PHY circuits 806a, 806b. In some examples, each of the clock generation circuits 804a, 804b includes a clock source such as a PLL, delay locked loop (DLL) or other types of configurable clock generator. The clock generation circuits 804a, 804b output a clock signal 814a, 814b to their respective DSI PHY circuits 806a, 806b. The clock signals 814a, 814b may be configured to control timing of transmissions on the serial data link 820. The clock generation circuits 804a, 804b may be configured by a controller or processor 812 to generate clock signals 814a, 814b at different frequencies when ping-pong DSI PHY switching is to be performed. For example, one clock generation circuit 804a or 804b may be configured to produce a 50 MHz clock signal 814a and the other clock generation circuit 804b or 804a may be configured to produce a 1.5 GHz clock signal 814b. Other combinations of clock frequencies may be implemented or configured. The controller or processor 812 may configure the clock generation circuits 804a, 804b to provide the clock signals 814a, 814b requested or defined for each of the DSI PHY circuits 806a, 806b in accordance with application demands or requirements. In some implementations, the clock generation circuits 804a and 804b may be included in a set of clock generation circuit that can provide a wide range of clock signals. In some instances, some clock generation circuits may be suited for generating high-frequency clock signals (up to 1.5 GHz or higher) while other clock generation circuits may be suited for generating lower-frequency clock signals including 50 MHz clock signals, for example. In some instances, the controller or processor 812 may select a clock generation circuit 804a, 804b for each of the DSI PHY circuits 806a, 806b based on application demands or requirements.

The controller or processor 812 may configure each of the DSI PHY circuits 806a, 806b in accordance with timing and protocol specifications defined by DSI standards. The controller or processor 812 may select between the DSI PHY circuits 806a, 806b to manage communication over the serial data link 820. A switching circuit 808 operated by the controller or processor 812 may be used to couple signals 818 to a wire interface circuit 810. In one example, the signals 818 are produced or generated by the selected DSI PHY circuit 806a or 806b. In another example, the signals 818 are provided to the selected DSI PHY circuit 806a or 806b by another circuit or by the controller or processor 812. The wire interface circuit 810 is configured to couple the application processor 802 to the serial data link 820 and may include line drivers, amplifiers, equalizers, filters and other circuits that can optimize the electrical interface between the application processor 802 and the wires of the serial data link 820.

A DSI PHY circuit 824 in the DDIC 822 is configured to extract data from signals received from the serial data link 820. The DSI PHY circuit 824 is coupled to a wire interface circuit 826 that is configured to couple the DDIC 822 to the serial data link 820. The wire interface circuit 826 may include receivers, amplifiers, equalizers, filters and other circuits that can optimize the electrical interface between the DDIC 822 and the wires of the serial data link 820. In one example, the DSI PHY circuit 824 operates in accordance with C-PHY protocols and may extract embedded clock information from transitions in sequences of symbols transmitted over the serial data link 820. The DSI PHY circuit 824 may capture symbols for decoding based on the extracted embedded clock information. In another example, the DSI PHY circuit 824 operates in accordance with D-PHY protocols and may capture data from the signals received over the serial data link 820 based on explicit timing information provided by a clock signal received from a wire of the serial data link 820.

The display subsystem 800 may be configured in accordance with certain aspects of this disclosure to implement or operate dual ping-pong DSI PHY switching. In one example, a first DSI PHY circuit 806a may be actively engaged in communication with the DDIC 822 over the serial data link 820. A second DSI PHY circuit 806b may be undergoing configuration or calibration in preparation for communication over the serial data link 820 at a clock rate different from the clock rate used by the first DSI PHY circuit 806a. The controller or processor 812 may be provided with a target DSI configuration that includes a desired clock rate and corresponding configurations for the DSI PHY and the DSI protocol. The configurations for the DSI PHY and the DSI protocol may be expressed as a set of parameters, register settings, and/or selected options appropriate for the desired clock rate. Certain aspects of the configurations may be applied to or managed by the controller or processor 812 or some combination of hardware and software sequences executed in or by the controller or processor 812. In one example, elements of the protocol configuration and/or the DSI PHY configuration may relate to NULL packets that may be inserted in the data stream that is to be transmitted through the second DSI PHY circuit 806b.

The configuration for the second DSI PHY circuit 806b may include certain targets, thresholds or limits to be applied to signaling over the serial data link 820 when the desired clock rate has been implemented. During configuration of the second DSI PHY circuit 806b, the corresponding clock generation circuit 804b may be configured to produce one or more clock signals at frequencies calculated to enable or facilitate data transmission at the desired data rate. In one example, the clock signals include versions of the desired clock signal that are phase-shifted with respect to one another. In another example, the one or more clock signals include half rate or double rate versions of the desired clock signal. Calibration of the second DSI PHY circuit 806b may include calibration of the clock signals generated by the associated clock generation circuit 804b.

When the second DSI PHY circuit 806b has been configured and calibrated, the controller or processor 812 may transmit one or more commands to the DDIC 822 to cause the DDIC 822 to reconfigure and/or recalibrate its DSI PHY circuit 824 and wire interface circuit 826. The controller or processor 812 may also transmit configuration parameters to facilitate the reconfiguration and recalibration. The DDIC 822 may perform the reconfiguration and recalibration during the next period in which the serial data link 820 is idle. The controller or processor 812 may initiate a switch between DSI PHY circuits 806a and 806b during the idle period. The controller or processor 812 may reconfigure the wire interface circuit 810 in the application processor 802 to facilitate the change in data rate prior to a switch between the DSI PHY circuits 806a and 806b. The wire interface circuits 810, 826 may be calibrated during the idle period or during transmission of certain preambles defined the C-PHY or D-PHY protocol used to control data communication over the serial data link 820.

The controller or processor 812 may cause the switching circuit 808 to register the new selection of the second DSI PHY circuit 806b as the active PHY. The switching circuit 808 may respond to the change in selection during an idle period of the serial data link 820 as indicated by a signal 816 received from the wire interface circuit 810. In some implementations, the controller or processor 812 indicates when the idle period has commenced. In some examples, the signal 816 clocks a flipflop or register that captures the PHY selection information. Commands may be sent by the application processor 802 to the DDIC 822 to prepare for a change in data rate before the switching circuit 808 registers the new selection of the second DSI PHY circuit 806b as the active PHY. These commands and associated configuration information enable the DDIC 822 to reconfigure its DSI PHY circuit 824, wire interface circuit 826 and one or more associated display panels to be reconfigured and to prepare clock generation circuits to be locked to new DSI clock value. De-skew calibration for D-PHY or for C-PHY may be triggered when the target bit clock is at certain higher frequencies. In one example, DSI protocols provide for de-skew training when clock signals have a frequency of 1.8 GHz and no de-skew training is provided when clock signals have a frequency of 150 MHz.

Figure 9:
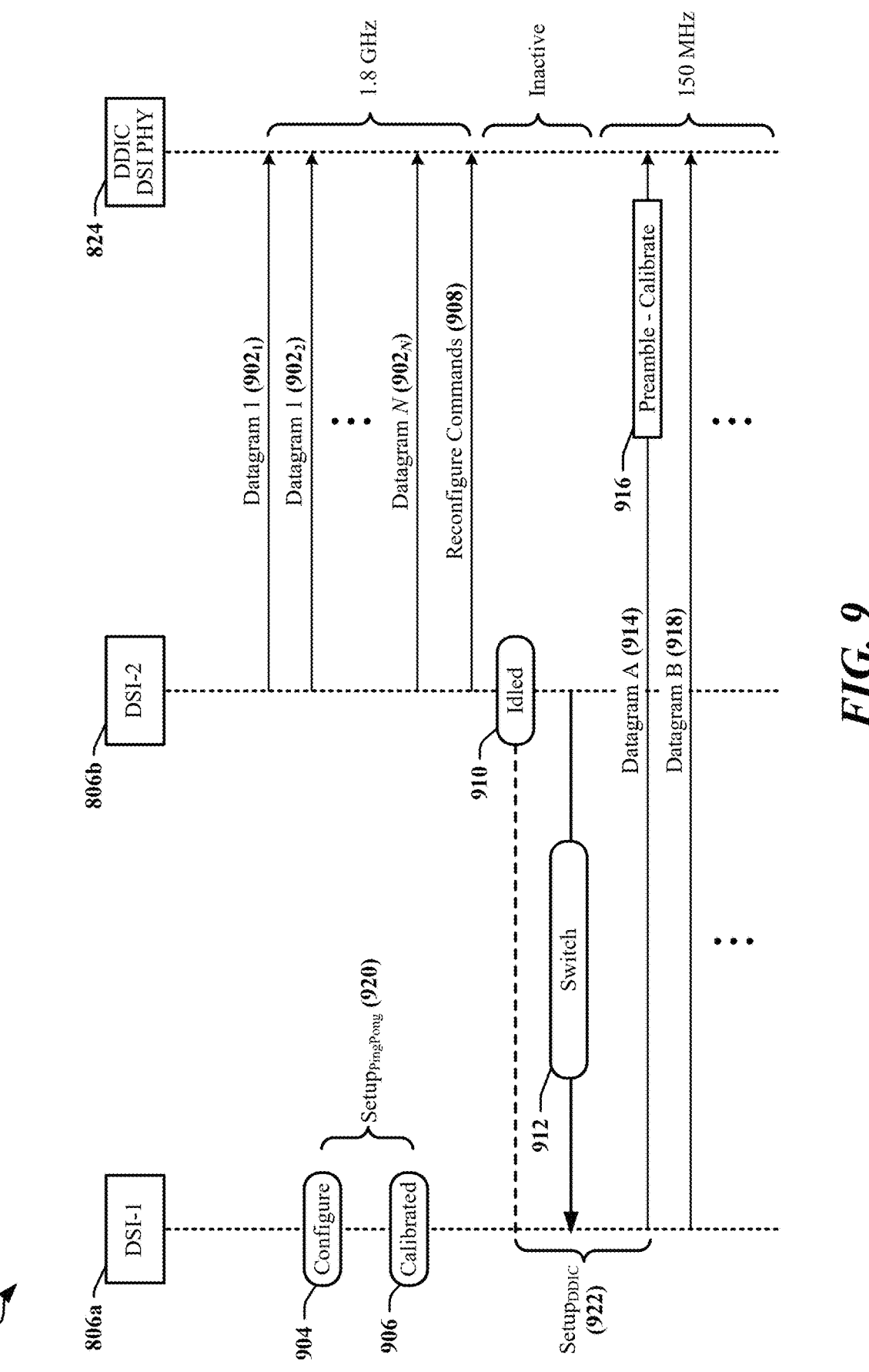
FIG. 9 illustrates an example of messaging over a serial data link when the display subsystem of FIG. 8 is configured for dual ping-pong MIPI Alliance DSI PHY switching in accordance with certain aspects of this disclosure.

FIG. 9 is a message flow diagram that illustrates an example of messaging 900 over the serial data link 820 when the display subsystem 800 of FIG. 8 is configured for dual ping-pong DSI PHY switching in accordance with certain aspects of this disclosure. In the illustrated example, the first DSI PHY circuit 806a is initially in an idle state while the second DSI PHY circuit 806b is initially engaged in communication with the DDIC 822 over the serial data link 820 in accordance with a clock signal 814a that has a frequency of 1.8 GHz. For example, the second DSI PHY circuit 806b may be transmitting image data in a sequence of datagrams $902_1$-$902_n$. At a first point in time 904, the first DSI PHY circuit 806a is reconfigured for 150 MHz operation. The first DSI PHY circuit 806a may receive commands and/or parameters that define the operating characteristics for 150 MHz operation under DSI specifications. The first DSI PHY circuit 806a may begin configuration and calibration procedures. In some examples, the controller or processor 812 may configure an associated clock generation circuit 804a to produce one or more clock signals used for 150 MHz operation. The clock generation circuit 804a may take some time to stabilize and the calibration of the first DSI PHY circuit 806a may continue until a stable 150 MHz configuration has been accomplished. At a second point in time 906, configuration and calibration are determined by the controller or processor 812 to be complete, and the controller or processor 812 schedules, queues or otherwise causes the second DSI PHY circuit 806b to transmit one or more datagrams 908 that include commands and/or data configured to cause the DDIC 822 to prepare for a reconfiguration of its DSI PHY circuit 824, wire interface circuit 826 and protocol handler to support 150 MHz operation. In some examples, the commands and/or data are configured to cause the DDIC 822 to switch from 1.8 GHz operation to 150 MHz operation when the serial data link 820 enters an idle state.

In the illustrated example, the serial data link 820 enters the idle state at a third point in time 910, and the DDIC 822 can begin reconfiguration and recalibration of its DSI PHY circuit 824, wire interface circuit 826 and protocol handler. In the application processor 802, the controller or processor 812 causes the switching circuit 808 to decouple signals produced or received by the second DSI PHY circuit 806b from the wire interface circuit 810 and to couple signals produced or received by the first DSI PHY circuit 806a to the wire interface circuit 810. The controller or processor 812 may further cause reconfiguration of protocol handlers to take effect. The first DSI PHY circuit 806a may then be used for communications between the application processor 802 and the DDIC 822. Additional calibration may be performed during preamble transmissions defined by C-PHY and D-PHY protocols. In the illustrated example, a transmitted preamble 916 is shown in the first datagram 914 transmitted by the first DSI PHY circuit 806a after the switch from 1.8 GHz operation to 150 MHz operation.

It will be appreciated that protocol-specified preambles may be transmitted in every datagram $902_1$-$902_n$, 908, 914, 918. It will be further appreciated that the procedure illustrated in FIG. 9 may be repeated with the first DSI PHY circuit 806a and second DSI PHY circuit 806b alternating between active and idle states for each iteration of the procedure. The procedure illustrated in FIG. 9 may applied to any combination of frequencies of operation supported by the application processor 802 and DDIC 822. A frequency of operation can be supported when the application processor 802 and DDIC 822 can be configured to comply with DSI PHY timing and DSI protocol configurations defined by DSI specifications or C-PHY or D-PHY protocols. The DSI PHY timing and DSI protocol configurations may be communicated by the controller or processor 812 prior to a ping-pong DSI PHY switch. The frequency of operation may be selected based on display mode, to reduce power, or to reduce EMI caused by transmissions over the serial data link 820. In one example, the first DSI PHY circuit 806a may be configured for 10 FPS (refresh rate is 10 Hz) and the second DSI PHY circuit 806b may be configured for 120 FPS (refresh rate is 120 Hz). In another example, the procedure illustrated in FIG. 9 may relate to a switch initiated for power reduction purposes where the display subsystem 800 is switched from 1.8 GHz operation to 150 MHz operation.

The time elapsed between the initiation of configuration at the first point in time 904 and the determination that calibration has been completed at the second point in time 906 may be referred to as the ping-pong setup time 920. According to certain aspects, the ping-pong setup time 920 may be configured to provide sufficient time for a DSI PHY circuit 806a, 806b in the application processor 802 to complete configuration and calibration of internal and external circuits. In some examples, the ping-pong setup time 920 provides sufficient time to obtain PLL lock and timing stability of circuits that respond to the clock signals 814a, 814b.

The time elapsed between the third point in time 904, when the serial data link 820 enters the idle state, and the transmission of the first datagram 914 by the first DSI PHY circuit 806a may be referred to as the DDIC setup time 922. According to certain aspects, the DDIC setup time 922 may be configured to provide sufficient time for a DSI PHY circuit 824 in the DDIC 822 to complete configuration and calibration of internal and external circuits including. In some examples, the DDIC setup time 922 provides sufficient time to obtain stability of clock generation circuits and other circuits that respond to clock signals used to sample the serial data link 820.

The ping-pong setup time 920 and the DDIC setup time 922 may be configured to flexibly support a large range of dynamic DSI clock changes. In some implementations, a pair of DSI PHY circuits 806a, 806b is available for use in ping-pong DSI PHY switching. However, both DSI PHY circuits 806a, 806b need not be provided in the same IC device. Furthermore, ping-pong DSI PHY switching can be used with more than two DSI PHY circuits 806a, 806b. For example, one or more DSI PHY circuits 806a, 806b may be capable of operating at ranges of frequencies that do not fully overlap and one or more additional DSI PHY circuits may be provided to enable ping-pong DSI PHY switching over a larger frequency range.

Ping-pong DSI PHY switching can be implemented in SoCs or other IC devices that have multiple DSI PHY circuits. A hardware switch circuit may be added. The hardware switch typically consumes very low power and occupies a small area of the SoC or IC device, measured as a percentage of the DSI PHY. Ping-pong DSI PHY switching can provide fast, stable and safe DSI clock changes over a large range of operating frequencies. The availability of fast, stable and safe Ping-pong DSI PHY switching can permit a system to obtain increased power savings without loss of performance and reliability during switching. For example, low-temperature polycrystalline oxide (LTPO) organic light-emitting diode (OLED) display panels can operate at a much lower FPS and dynamic DSI clock changes from 1.7 GHZ to 0.2 GHz associated with LTPO can be undertaken with confidence using ping-pong DSI PHY switching, increasing the power savings that can be accomplished.

Examples of Processing Circuits and Methods

Figure 10:
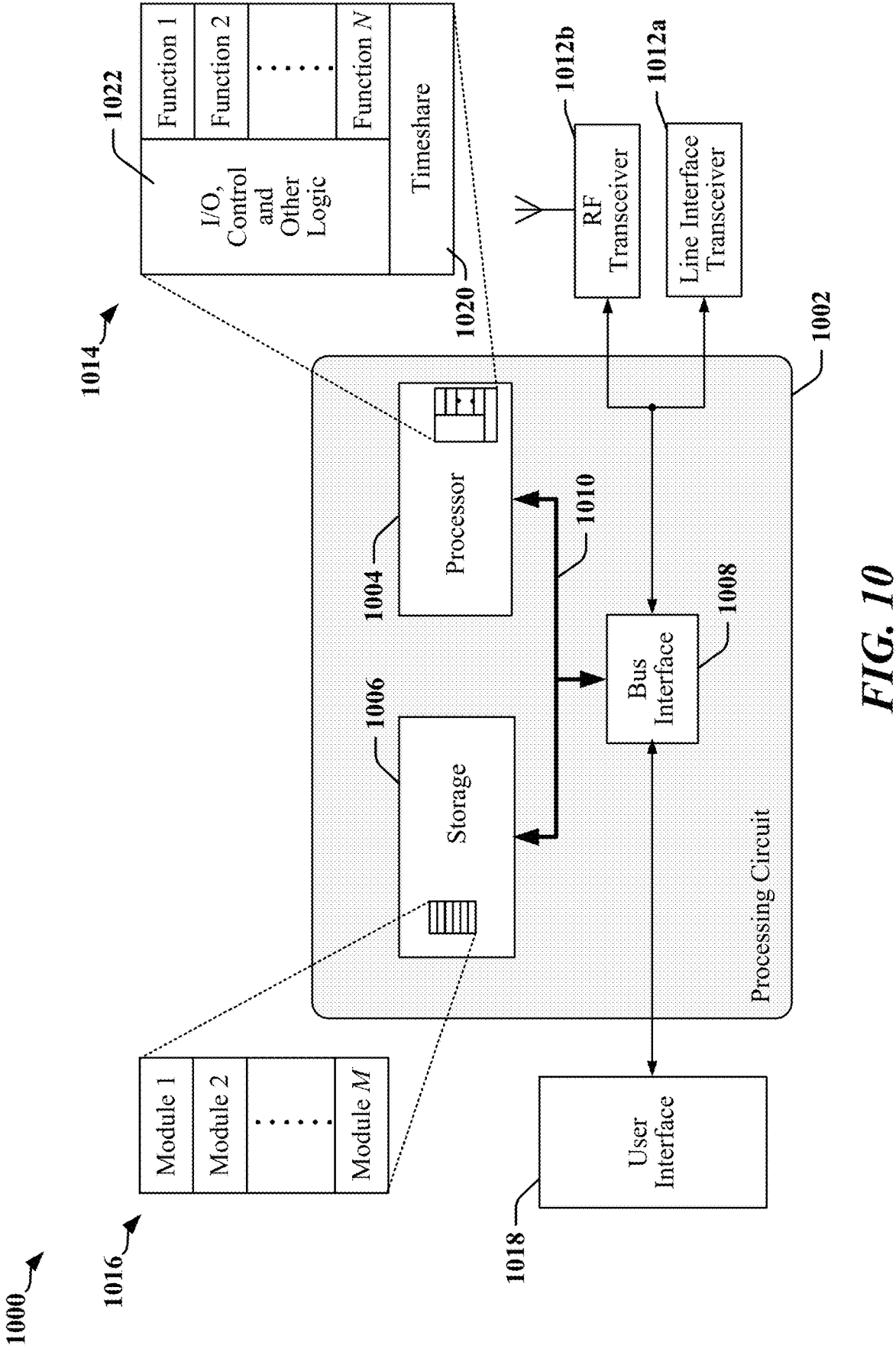
FIG. 10 illustrates one example of an apparatus employing a processing circuit that may be adapted according to certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FP- GAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012*a*, 1012*b*. A transceiver 1012*a*, 1012*b* may be provided for each networking technology supported by the processing circuit. In some instances, multiple networking technologies may share some or all of the circuitry or processing modules found in a transceiver 1012*a*, 1012*b*. Each transceiver 1012*a*, 1012*b* provides a means for communicating with various other apparatus over a transmission medium. In one example, a transceiver 1012*a* may be used to couple the apparatus 1000 to a multi-wire bus. In another example, a transceiver 1012*b* may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement certain methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012*a*, 1012*b*, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012*a*, 1012*b*, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012*a*, 1012*b*, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
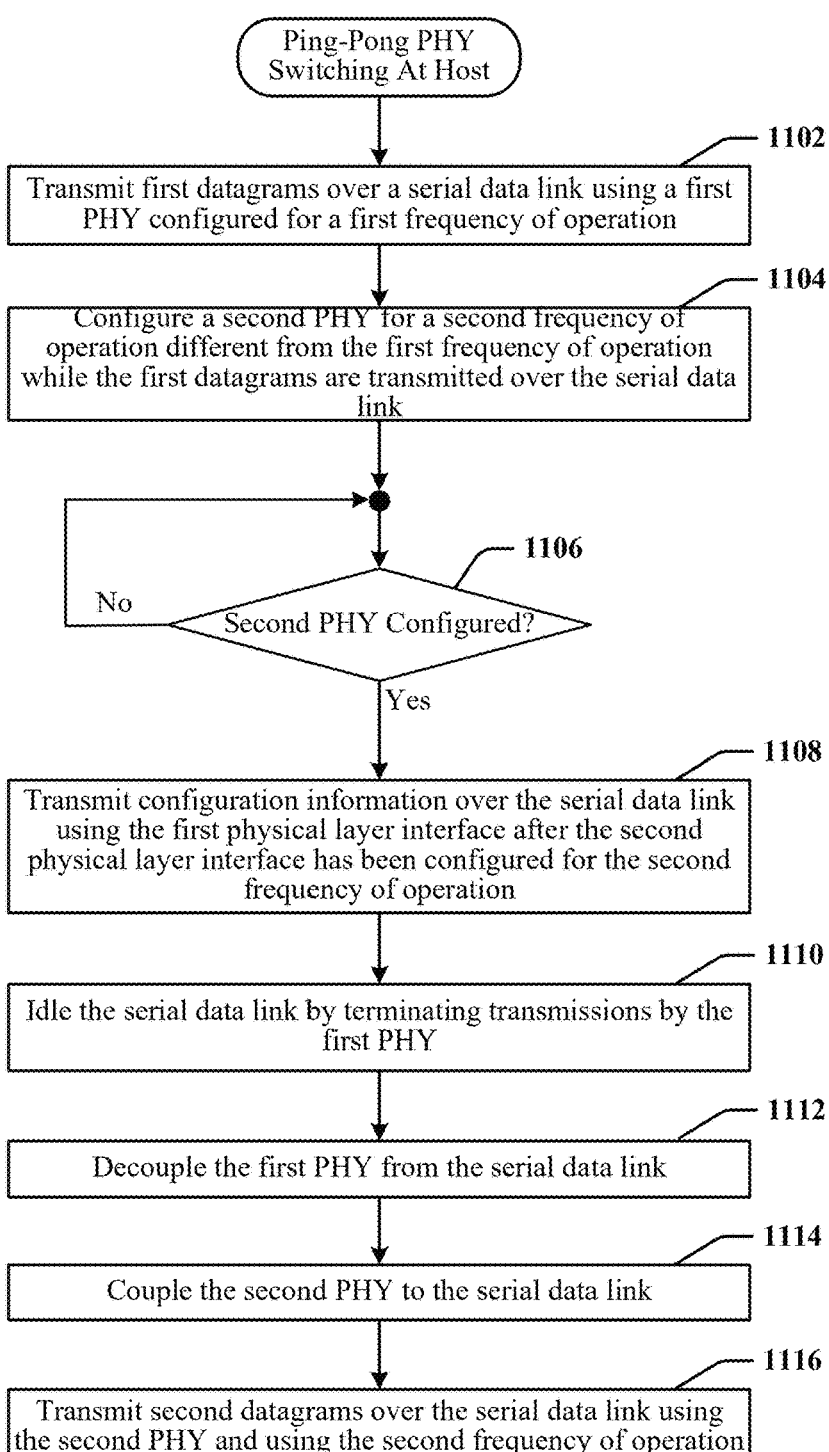
FIG. 11 is a flowchart that illustrates a method that may be performed by a host device that is coupled to a serial bus in accordance with certain aspects disclosed herein.

FIG. 11 is a flowchart 1100 of a method for changing operating frequency of a serial data link at a host or application processor. The method may be implemented in a display subsystem that is configured for ping-pong DSI PHY switching in accordance with certain aspects of this disclosure. In one example, a mobile communication device includes a serial data link operated in accordance with C-PHY or D-PHY protocols. The method may be performed using a controller or other processor in the mobile communication device.

In the illustrated method, at block 1102, the controller may transmit first datagrams over the serial data link using a first PHY configured for a first frequency of operation. The PHY may operate in accordance with specifications for DSI PHY. At block 1104, the controller may configure a second PHY for a second frequency of operation different from the first frequency of operation while the first datagrams are transmitted over the serial data link. The method may be delayed at block 1106 until the second PHY has been configured. In some examples, the method is delayed at block 1106 until the second PHY has been calibrated.

At block 1108, the controller may transmit configuration information over the serial data link using the first PHY after the second PHY has been configured for the second frequency of operation. In one example, the configuration information is transmitted to DDIC. After transmitting the configuration information, the controller may idle the serial data link at block 1110 by terminating transmissions by the first PHY. At block 1112, the controller may decouple the first PHY from the serial data link, and at block 1114, the controller may couple the second PHY to the serial data link. The decoupling of the first PHY from the serial data link and the subsequent coupling of the second PHY to the serial data link may be referred to as PHY switch. Repetitive PHY switching between two PHYs may be referred to as ping-pong switching. At block 1116, the controller may transmit second datagrams over the serial data link using the second PHY and using the second frequency of operation.

In certain examples, the configuration information is configured to cause a display driver coupled to the serial data link to reconfigure its PHY from the first frequency of operation to the second frequency of operation after the serial data link has been idled. The first PHY and the second PHY may be configured in accordance with MIPI Alliance DSI specifications. In some examples, configuring the second PHY includes configuring a clock generation circuit to provide one or more clock signals corresponding to the second frequency of operation, and calibrating the clock generation circuit.

In certain examples, a switch may be used to decouple the first PHY from the serial data link and couple the second PHY to the serial data link. The switch may select between the first PHY and the second PHY to drive or manage the serial data link. The switch is coupled to a wire interface circuit that is coupled to the serial data link. The controller may reconfigure the wire interface circuit after the serial data link has been idled by, for example, calibrating the wire interface circuit for the second frequency of operation. The controller may calibrate the wire interface circuit using a bus calibration procedure defined by C-PHY or D-PHY protocols when transmitting the second datagrams.

Figure 12:
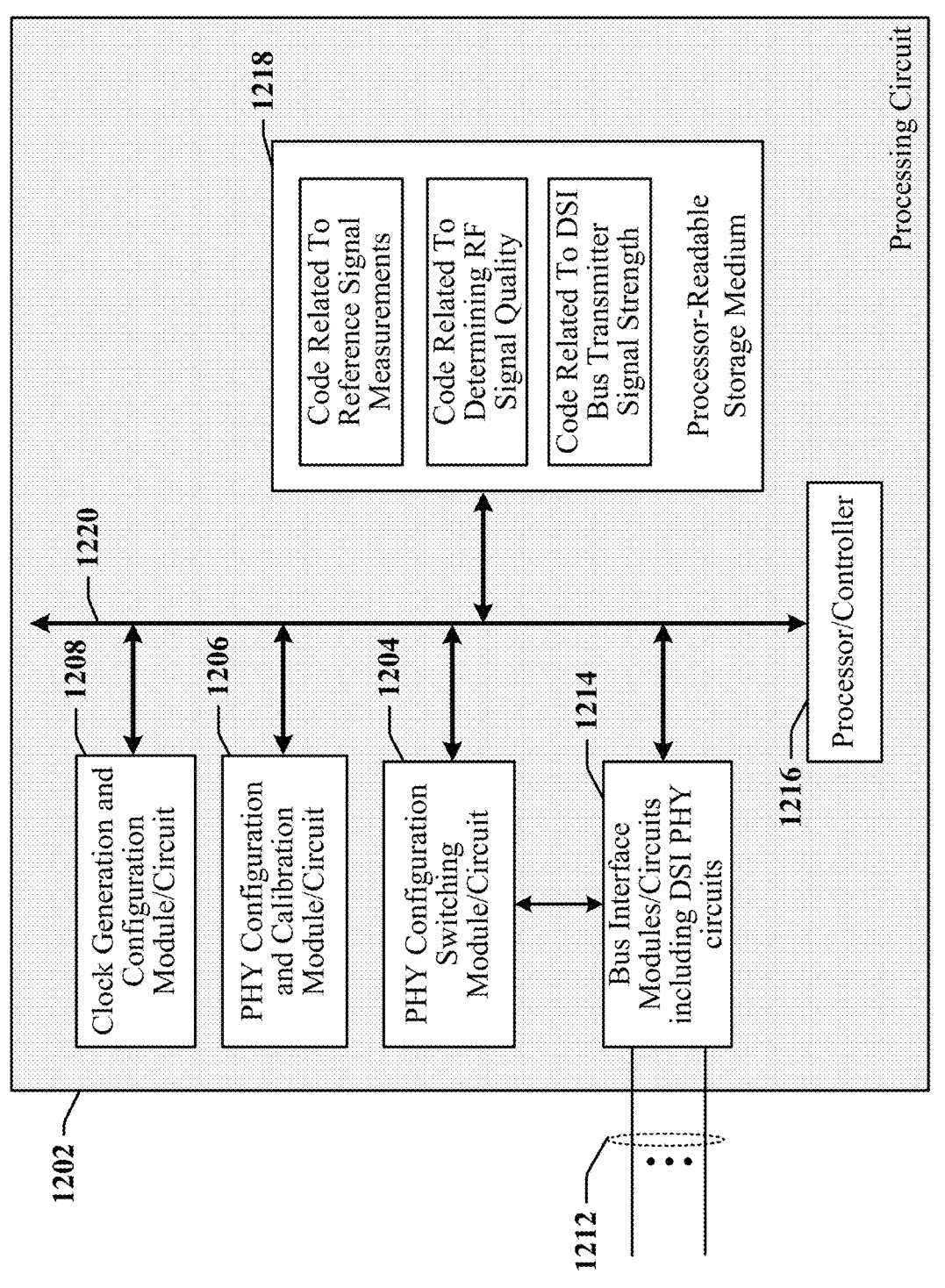
FIG. 12 illustrates a first example of a hardware implementation for a communication apparatus adapted in accordance with certain aspects disclosed herein.

FIG. 12 is a diagram illustrating a first example of a hardware implementation for an apparatus 1200 employing a processing circuit 1202. The processing circuit typically has one or more microprocessors, microcontrollers, digital signal processors, sequencers and/or state machines, represented generally by the processors 1216. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors 1216, the modules or circuits 1204, 1206 and 1208 and the processor-readable storage medium 1218. A bus interface circuit and/or module 1214 may be provided to support communications over a serial data link 1212. The bus 1220 may also link various other circuits such as timing sources, peripherals, voltage regulators, and power management circuits, which are well known in the art, and therefore, will not be described any further.

The processors 1216 may be responsible for general processing, including the execution of software, code and/or instructions stored on the processor-readable storage medium 1218. The processor-readable storage medium 1218 may include a non-transitory storage medium. The software, when executed by the processors 1216, causes the processing circuit 1202 to perform the various functions described supra for any particular apparatus. The processor-readable storage medium may be used for storing data that is manipulated by the processors 1216 when executing software. The processing circuit 1202 further includes at least one of the modules 1204, 1206 and 1208. The modules 1204, 1206 and 1208 may be software modules running in the processors 1216, resident/stored in the processor-readable storage medium 1218, one or more hardware modules coupled to the processors 1216, or some combination thereof. The modules 1204, 1206 and 1208 may include microcontroller instructions, state machine configuration parameters, or some combination thereof.

In one configuration, the apparatus 1200 includes modules and/or circuits 1204 adapted to select and switch between PHYs for coupling to the serial data link 1212, modules and/or circuits 1206 adapted to configure and calibrate PHYs while the PHYs are idle or inactive, and modules and/or circuits 1208 adapted to configure, generate and calibrate clock signals used by the PHYs.

In one example, the apparatus 1200 is configured to operate as a mobile communication device that has a wireless transceiver configured to transmit and receive RF signals through one or more antennas, a bus interface circuit and/or module 1214 configured to couple the apparatus 1200 to a serial data link, and a controller or other processor. The bus interface circuit and/or module 1214 may include a first PHY and a second PHY, each being configured for DSI operations and a switch configured to select between the first PHY and the second PHY and to couple the selected PHY to a wire driver circuit that is coupled to the serial data link. The controller may be configured to cause first datagrams to be transmitted over the serial data link using the first PHY using a first frequency of operation, configure the second PHY for a second frequency of operation different from the first frequency of operation while the first datagrams are transmitted over the serial data link, cause the first PHY to transmit configuration information over the serial data link using the first frequency of operation after the second PHY has been configured for the second frequency of operation, idle the serial data link after the configuration information has been transmitted by causing the first PHY to terminate transmissions over the serial data link, cause the switch to decouple the first PHY from the serial data link, cause the switch to couple the second PHY to the serial data link, and cause second datagrams to be transmitted over the serial data link using the second PHY and using the second frequency of operation.

In some examples, the display subsystem has a display driver coupled to the serial data link and configured to reconfigure its PHY from the first frequency of operation to the second frequency of operation in response to the configuration information and after the serial data link has been idled. In some examples, the controller is further configured to configure a clock generation circuit to provide one or more clock signals corresponding to the second frequency of operation, and calibrate the clock generation circuit.

In certain examples, the switch is coupled to a wire interface circuit that is coupled to serial data link. The controller may be further configured to reconfigure the wire interface circuit after the serial data link has been idled, and calibrate the wire interface circuit for the second frequency of operation. The controller may be further configured to calibrate the wire interface circuit using a bus calibration procedure defined by C-PHY or D-PHY protocols when transmitting the second datagrams.

The processor-readable storage medium 1218 may include instructions that cause the processing circuit 1202 to transmit first datagrams over the serial data link using a first PHY configured for a first frequency of operation, configure a second PHY for a second frequency of operation different from the first frequency of operation while the first datagrams are transmitted over the serial data link, and transmit configuration information over the serial data link using the first PHY after the second PHY has been configured for the second frequency of operation. The processor-readable storage medium 1218 may include instructions that cause the processing circuit 1202, after transmitting the configuration information, to idle the serial data link by terminating transmissions by the first PHY, decouple the first PHY from the serial data link, couple the second PHY to the serial data link, and transmit second datagrams over the serial data link using the second PHY and using the second frequency of operation.

In some examples, the configuration information is configured to cause a display driver coupled to the serial data link to reconfigure its PHY from the first frequency of operation to the second frequency of operation after the serial data link has been idled. In some examples, the first PHY and the second PHY are configured in accordance with MIPI Alliance DSI specifications. In some examples, configuring the second PHY includes configuring a clock generation circuit to provide one or more clock signals corresponding to the second frequency of operation, and calibrating the clock generation circuit.

In certain examples, instructions cause the processing circuit 1202 to use a switch to decouple the first PHY from the serial data link and couple the second PHY to the serial data link. The switch may be coupled to a wire interface circuit coupled to serial data link. The instructions may cause the processing circuit 1202 to reconfigure the wire interface circuit after the serial data link has been idled, including calibrating the wire interface circuit for the second frequency of operation. The instructions may cause the processing circuit 1202 to calibrate the wire interface circuit using a bus calibration procedure defined by C-PHY or D-PHY protocols when transmitting the second datagrams.

Figure 13:
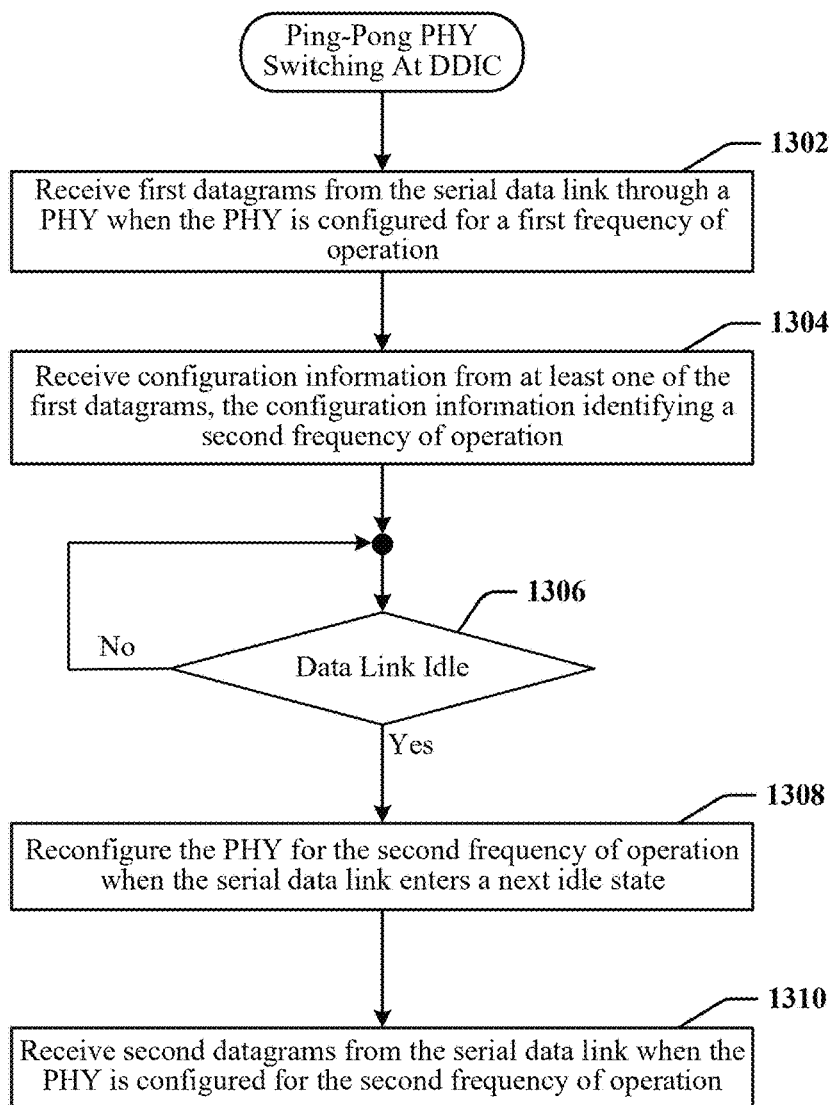
FIG. 13 is a flowchart that illustrates a method that may be performed by a display driver device that is coupled to a serial bus in accordance with certain aspects disclosed herein.

FIG. 13 is a flowchart 1300 of a method for conforming to changes in operating frequency of a serial data link at a display driver. The method may be implemented in a display subsystem that is configured for ping-pong DSI PHY switching in accordance with certain aspects of this disclosure. In one example, a mobile communication device includes a serial data link operated in accordance with C-PHY or D-PHY protocols. The method may be performed using a controller or other processor in the display driver.

In the illustrated method, at block 1302, the controller may receive first datagrams from the serial data link through a PHY when the PHY is configured for a first frequency of operation. At block 1304, the controller may receive configuration information from at least one of the first datagrams. The configuration information may identify a second frequency of operation. At block 1306, the method may be paused until the serial data link is idle. The serial data link becoming idle may serve as a trigger for the controller to update the configuration of the PHY and related circuits and modules. Other triggers may be used, including explicit commands and timers, for example.

At block 1308, the controller may reconfigure the PHY for the second frequency of operation when the serial data link enters a next idle state. At block 1310, the controller may receive second datagrams from the serial data link when the PHY is configured for the second frequency of operation. In one example, the PHY is configured in accordance with MIPI Alliance DSI specifications.

In certain examples, configuring the PHY includes configuring a clock generation circuit to provide one or more clock signals corresponding to the second frequency of operation, and calibrating the clock generation circuit. The controller may reconfigure the wire interface circuit after the serial data link has been idled, and may calibrate the wire interface circuit for the second frequency of operation. The controller may calibrate the wire interface circuit using a bus calibration procedure defined by C-PHY or D-PHY protocols when receiving the second datagrams.

Figure 14:
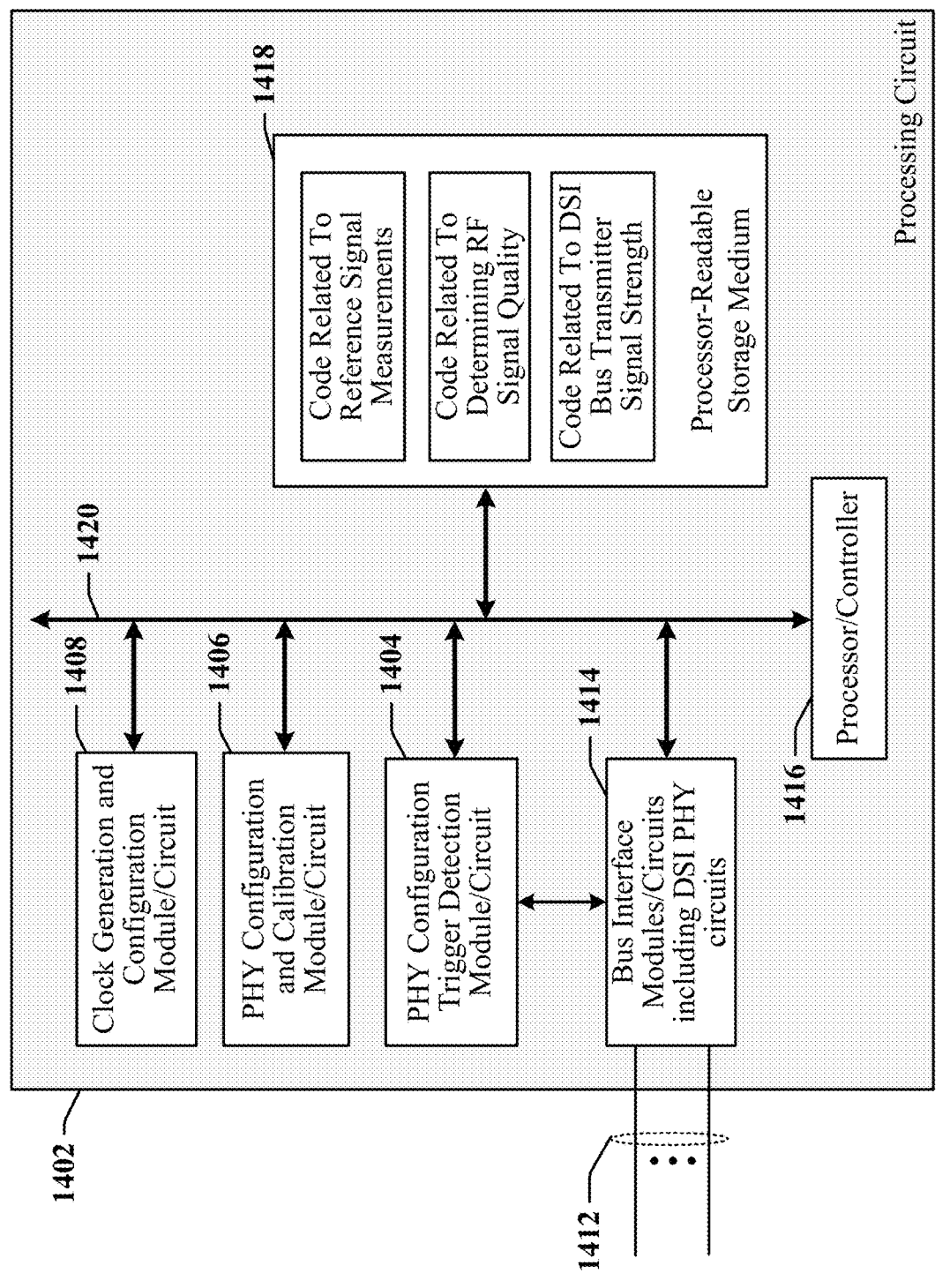
FIG. 14 illustrates a second example of a hardware implementation for a communication apparatus adapted in accordance with certain aspects disclosed herein.

FIG. 14 is a diagram illustrating a second example of a hardware implementation for an apparatus 1400 employing a processing circuit 1402. The processing circuit typically has one or more microprocessors, microcontrollers, digital signal processors, sequencers and/or state machines, represented generally by the processors 1416. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors 1416, the modules or circuits 1404, 1406 and 1408 and the processor-readable storage medium 1418. A bus interface circuit and/or module 1414 may be provided to support communications over a serial data link 1412. The bus 1420 may also link various other circuits such as timing sources, peripherals, voltage regulators, and power management circuits, which are well known in the art, and therefore, will not be described any further.

The processors 1416 may be responsible for general processing, including the execution of software, code and/or instructions stored on the processor-readable storage medium 1418. The processor-readable storage medium 1418 may include a non-transitory storage medium. The software, when executed by the processors 1416, causes the processing circuit 1402 to perform the various functions described supra for any particular apparatus. The processor-readable storage medium may be used for storing data that is manipulated by the processors 1416 when executing software. The processing circuit 1402 further includes at least one of the modules 1404, 1406 and 1408. The modules 1404, 1406 and 1408 may be software modules running in the processors 1416, resident/stored in the processor-readable storage medium 1418, one or more hardware modules coupled to the processors 1416, or some combination thereof. The modules 1404, 1406 and 1408 may include microcontroller instructions, state machine configuration parameters, or some combination thereof.

In one configuration, the apparatus 1400 includes modules and/or circuits 1404 adapted to detect triggers to implement configuration changes, modules and/or circuits 1406 adapted to configure a PHY circuit for a variety of possible operating frequencies, and modules and/or circuits 1408 adapted to generate, configure, manage and calibrate one or more clock signals used by the PHY at a desired operating frequency.

In one example, the apparatus 1400 is configured to operate as a DDIC that has a bus interface circuit and/or module 1414 configured in accordance with MIPI Alliance DSI specifications and a controller. The controller may be configured to cause data to be extracted from first datagrams received from the serial data link through the PHY when the PHY is configured for a first frequency of operation, receive configuration information from at least one of the first datagrams, the configuration information identifying a second frequency of operation, reconfigure the PHY for the second frequency of operation when the serial data link enters a next idle state, and cause data to be extracted from second datagrams received from the serial data link when the PHY is configured for the second frequency of operation.

In one example, the controller is further configured to configure a clock generation circuit to provide one or more clock signals corresponding to the second frequency of operation, and calibrate the clock generation circuit.

In certain examples, the PHY is coupled to a wire interface circuit that is coupled to the serial data link. The controller may be further configured to reconfigure the wire interface circuit after the serial data link has been idled, and calibrate the wire interface circuit for the second frequency of operation. The controller may be further configured to calibrate the wire interface circuit using a bus calibration procedure defined by C-PHY or D-PHY protocols when transmitting the second datagrams.

The processor-readable storage medium 1418 may include instructions that cause the processing circuit 1402 to receive a measurement of a reference signal representative of RF signal quality at the mobile communication device, determine whether the measurement of the reference signal indicates that the RF signal quality is less than a minimum RF signal quality level, and reduce signal strength of a transmitter coupled to a serial bus provided in the mobile communication device when the RF signal quality falls below the minimum RF signal quality level.

The processor-readable storage medium 1418 may include instructions that cause the processing circuit 1402 to receive first datagrams from the serial data link through a PHY when the PHY is configured for a first frequency of operation, receive configuration information from at least one of the first datagrams, the configuration information identifying a second frequency of operation, reconfigure the PHY for the second frequency of operation when the serial data link enters a next idle state, and receive second datagrams from the serial data link when the PHY is configured for the second frequency of operation. In some examples, the PHY is configured in accordance with MIPI Alliance DSI specifications.

In certain examples, the instructions for configuring the PHY include instructions for configuring a clock generation circuit to provide one or more clock signals corresponding to the second frequency of operation, and calibrating the clock generation circuit. In some examples, the processor-readable storage medium 1418 includes instructions that cause the processing circuit 1402 to reconfigure the wire interface circuit after the serial data link has been idled, and calibrate the wire interface circuit for the second frequency of operation. In some examples, the processor-readable storage medium 1418 includes instructions that cause the processing circuit 1402 to calibrate the wire interface circuit using a bus calibration procedure defined by C-PHY or D-PHY protocols when receiving the second datagrams.

Some implementation examples are described in the following numbered clauses:

1. A display subsystem comprising: a first physical layer interface configured in accordance with Mobile Industry Processor Interface (MIPI) Alliance display serial interface (DSI) specifications; a second physical layer interface configured in accordance with the MIPI Alliance DSI specifications; and a switch configured to selectively couple a serial data link to the first physical layer interface or to the second physical layer interface as directed by a controller, wherein the controller is configured to: cause first datagrams to be transmitted over the serial data link using the first physical layer interface using a first frequency of operation; configure the second physical layer interface for a second frequency of operation different from the first frequency of operation while the first datagrams are transmitted over the serial data link; cause the first physical layer interface to transmit configuration information over the serial data link using the first frequency of operation after the second physical layer interface has been configured for the second frequency of operation; after the configuration information has been transmitted, idle the serial data link by causing the first physical layer interface to terminate transmissions over the serial data link, cause the switch to decouple the first physical layer interface from the serial data link, and cause the switch to couple the second physical layer interface to the serial data link; and cause second datagrams to be transmitted over the serial data link using the second physical layer interface using the second frequency of operation.

2. The display subsystem as described in clause 1, further comprising: a display driver coupled to the serial data link and configured to reconfigure its physical layer interface from the first frequency of operation to the second frequency of operation in response to the configuration information and after the serial data link has been idled.

3. The display subsystem as described in clause 1 or clause 2, wherein the controller is further configured to: configure a clock generation circuit to provide one or more clock signals corresponding to the second frequency of operation; and calibrate the clock generation circuit.

4. The display subsystem as described in any of clauses 1-3, wherein the switch is coupled to a wire interface circuit that is coupled to the serial data link.

5. The display subsystem as described in clause 4, wherein the controller is further configured to: reconfigure the wire interface circuit after the serial data link has been idled; and calibrate the wire interface circuit for the second frequency of operation.

6. The display subsystem as described in clause 5, wherein the controller is further configured to: calibrate the wire interface circuit using a bus calibration procedure defined by C-PHY or D-PHY protocols when transmitting the second datagrams.

7. A method for changing operating frequency in a serial data link, comprising: transmitting first datagrams over the serial data link using a first physical layer interface configured for a first frequency of operation; configuring a second physical layer interface for a second frequency of operation different from the first frequency of operation while the first datagrams are transmitted over the serial data link; transmitting configuration information over the serial data link using the first physical layer interface after the second physical layer interface has been configured for the second frequency of operation; after transmitting the configuration information, idling the serial data link by terminating transmissions by the first physical layer interface, decoupling the first physical layer interface from the serial data link, and coupling the second physical layer interface to the serial data link; and transmitting second datagrams over the serial data link using the second physical layer interface using the second frequency of operation.

8. The method as described in clause 7, wherein the configuration information is configured to cause a display driver coupled to the serial data link to reconfigure its physical layer interface from the first frequency of operation to the second frequency of operation after the serial data link has been idled.

9. The method as described in clause 7 or clause 8, wherein the first physical layer interface and the second physical layer interface are configured in accordance with Mobile Industry Processor Interface (MIPI) Alliance display serial interface (DSI) specifications.

10. The method as described in any of clauses 7-9, wherein configuring the second physical layer interface comprises: configuring a clock generation circuit to provide one or more clock signals corresponding to the second frequency of operation; and calibrating the clock generation circuit.

11. The method as described in any of clauses 7-10, further comprising: using a switch to decouple the first physical layer interface from the serial data link and couple the second physical layer interface to the serial data link.

12. The method as described in clause 11, wherein the switch is coupled to a wire interface circuit that is coupled to the serial data link.

13. The method as described in clause 12, further comprising: reconfiguring the wire interface circuit after the serial data link has been idled, including calibrating the wire interface circuit for the second frequency of operation.

14. The method as described in clause 13, further comprising: calibrating the wire interface circuit using a bus calibration procedure defined by C-PHY or D-PHY protocols when transmitting the second datagrams.

15. A display driver comprising: a physical layer interface configured in accordance with Mobile Industry Processor Interface (MIPI) Alliance display serial interface (DSI) specifications; and a controller configured to: cause data to be extracted from first datagrams received from a serial data link through the physical layer interface when the physical layer interface is configured for a first frequency of operation; receive configuration information from at least one of the first datagrams, the configuration information identifying a second frequency of operation; reconfigure the physical layer interface for the second frequency of operation when the serial data link enters a next idle state; and cause data to be extracted from second datagrams received from the serial data link when the physical layer interface is configured for the second frequency of operation.

16. The display driver as described in clause 15, wherein the controller is further configured to: configure a clock generation circuit to provide one or more clock signals corresponding to the second frequency of operation; and calibrate the clock generation circuit.

17. The display driver as described in clause 15 or clause 16, wherein the physical layer interface is coupled to a wire interface circuit that is coupled to the serial data link.

18. The display driver as described in clause 17, wherein the controller is further configured to: reconfigure the wire interface circuit after the serial data link has been idled; and calibrate the wire interface circuit for the second frequency of operation.

19. The display driver as described in clause 18, wherein the controller is further configured to: calibrate the wire interface circuit using a bus calibration procedure defined by C-PHY or D-PHY protocols when receiving the second datagrams.

20. A method for changing operating frequency in a serial data link, comprising: receiving first datagrams from the serial data link through a physical layer interface when the physical layer interface is configured for a first frequency of operation; receiving configuration information from at least one of the first datagrams, the configuration information identifying a second frequency of operation; reconfiguring the physical layer interface for the second frequency of operation when the serial data link enters a next idle state; and receiving second datagrams from the serial data link when the physical layer interface is configured for the second frequency of operation.

21. The method as described in clause 20, wherein the physical layer interface is configured in accordance with Mobile Industry Processor Interface (MIPI) Alliance display serial interface (DSI) specifications.

22. The method as described in clause 20 or clause 21, wherein reconfiguring the physical layer interface comprises: configuring a clock generation circuit to provide one or more clock signals corresponding to the second frequency of operation; and calibrating the clock generation circuit.

23. The method as described in any of clauses 20-22, further comprising: reconfiguring a wire interface circuit after the serial data link has been idled; and calibrating the wire interface circuit for the second frequency of operation.

24. The method as described in clause 23, further comprising: calibrating the wire interface circuit using a bus calibration procedure defined by C-PHY or D-PHY protocols when receiving the second datagrams.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A display subsystem comprising:
a first physical layer interface configured in accordance with Mobile Industry Processor Interface (MIPI) Alliance display serial interface (DSI) specifications;
a second physical layer interface configured in accordance with the MIPI Alliance DSI specifications; and
a switch configured to selectively couple a serial data link to the first physical layer interface or to the second physical layer interface as directed by a controller, wherein the switch is coupled to a wire interface circuit that is coupled to the serial data link, and
wherein the controller is configured to:
cause first datagrams to be transmitted over the serial data link using the first physical layer interface using a first frequency of operation;
configure the second physical layer interface for a second frequency of operation different from the first frequency of operation while the first datagrams are transmitted over the serial data link;
cause the first physical layer interface to transmit configuration information over the serial data link using the first frequency of operation after the second physical layer interface has been configured for the second frequency of operation;
after the configuration information has been transmitted,
idle the serial data link by causing the first physical layer interface to terminate transmissions over the serial data link,
cause the switch to decouple the first physical layer interface from the serial data link, and
cause the switch to couple the second physical layer interface to the serial data link; and cause second datagrams to be transmitted over the serial data link using the second physical layer interface using the second frequency of operation.

2. The display subsystem of claim 1, further comprising:
a display driver coupled to the serial data link and configured to reconfigure its physical layer interface from the first frequency of operation to the second frequency of operation in response to the configuration information and after the serial data link has been idled.

3. The display subsystem of claim 1, wherein the controller is further configured to:
configure a clock generation circuit to provide one or more clock signals corresponding to the second frequency of operation; and
calibrate the clock generation circuit.

4. The display subsystem of claim 1, wherein the controller is further configured to:
reconfigure the wire interface circuit after the serial data link has been idled; and
calibrate the wire interface circuit for the second frequency of operation.

5. The display subsystem of claim 4, wherein the controller is further configured to:
calibrate the wire interface circuit using a bus calibration procedure defined by C-PHY or D-PHY protocols when transmitting the second datagrams.

6. A method for changing operating frequency in a serial data link, comprising:
transmitting first datagrams over the serial data link using a first physical layer interface configured for a first frequency of operation;
configuring a second physical layer interface for a second frequency of operation different from the first frequency of operation while the first datagrams are transmitted over the serial data link;
transmitting configuration information over the serial data link using the first physical layer interface after the second physical layer interface has been configured for the second frequency of operation;
after transmitting the configuration information,
idling the serial data link by terminating transmissions by the first physical layer interface, and
using a switch to decouple the first physical layer interface from the serial data link and couple the second physical layer interface to the serial data link; and
transmitting second datagrams over the serial data link using the second physical layer interface using the second frequency of operation.

7. The method of claim 6, wherein the configuration information is configured to cause a display driver coupled to the serial data link to reconfigure its physical layer interface from the first frequency of operation to the second frequency of operation after the serial data link has been idled.

8. The method of claim 6, wherein the first physical layer interface and the second physical layer interface are configured in accordance with Mobile Industry Processor Interface (MIPI) Alliance display serial interface (DSI) specifications.

9. The method of claim 6, wherein configuring the second physical layer interface comprises:
configuring a clock generation circuit to provide one or more clock signals corresponding to the second frequency of operation; and
calibrating the clock generation circuit.

10. The method of claim 6, wherein the switch is coupled to a wire interface circuit that is coupled to the serial data link.

11. The method of claim 10, further comprising:

reconfiguring the wire interface circuit after the serial data link has been idled, including calibrating the wire interface circuit for the second frequency of operation.

12. The method of claim 11, further comprising:

calibrating the wire interface circuit using a bus calibration procedure defined by C-PHY or D-PHY protocols when transmitting the second datagrams.

13. A display driver comprising:

a physical layer interface configured in accordance with Mobile Industry Processor Interface (MIPI) Alliance display serial interface (DSI) specifications, wherein the physical layer interface is coupled to a wire interface circuit that is coupled to a serial data link; and a controller configured to:

cause data to be extracted from first datagrams received from the serial data link through the physical layer interface when the physical layer interface is configured for a first frequency of operation;

receive configuration information from at least one of the first datagrams, the configuration information identifying a second frequency of operation;

reconfigure the physical layer interface for the second frequency of operation when the serial data link enters a next idle state; and cause data to be extracted from second datagrams received from the serial data link when the physical layer interface is configured for the second frequency of operation.

14. The display driver of claim 13, wherein the controller is further configured to:

configure a clock generation circuit to provide one or more clock signals corresponding to the second frequency of operation; and calibrate the clock generation circuit.

15. The display driver of claim 13, wherein the controller is further configured to:

reconfigure the wire interface circuit after the serial data link has been idled; and calibrate the wire interface circuit for the second frequency of operation.

16. The display driver of claim 15, wherein the controller is further configured to:

calibrate the wire interface circuit using a bus calibration procedure defined by C-PHY or D-PHY protocols when receiving the second datagrams.

17. A method for changing operating frequency in a serial data link, comprising:

receiving first datagrams from the serial data link through a physical layer interface when the physical layer interface is configured for a first frequency of operation;

receiving configuration information from at least one of the first datagrams, the configuration information identifying a second frequency of operation;

reconfiguring the physical layer interface for the second frequency of operation when the serial data link enters a next idle state; and receiving second datagrams from the serial data link when the physical layer interface is configured for the second frequency of operation, wherein the physical layer interface is configured in accordance with Mobile Industry Processor Interface (MIPI) Alliance display serial interface (DSI) specifications.

18. The method of claim 17, wherein reconfiguring the physical layer interface comprises:

configuring a clock generation circuit to provide one or more clock signals corresponding to the second frequency of operation; and calibrating the clock generation circuit.

19. The method of claim 17, further comprising:

reconfiguring a wire interface circuit after the serial data link has been idled; and calibrating the wire interface circuit for the second frequency of operation.

20. The method of claim 19, further comprising:

calibrating the wire interface circuit using a bus calibration procedure defined by C-PHY or D-PHY protocols when receiving the second datagrams.

* * * * *